US011028241B2

(12) United States Patent
Bonavoglia et al.

(10) Patent No.: US 11,028,241 B2
(45) Date of Patent: Jun. 8, 2021

(54) BREATHABLE FILMS AND METHOD OF MAKING THE SAME

(71) Applicant: Dow Global Technologies LLC, Midland, MI (US)

(72) Inventors: Barbara Bonavoglia, Horgen (CH); Selim Bensason, Horgen (CH); Jesus Nieto, Tarragona (ES); Cornelis F. J. Den Doelder, Terneuzen (NE)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/081,529

(22) PCT Filed: Mar. 3, 2017

(86) PCT No.: PCT/US2017/020681
§ 371 (c)(1),
(2) Date: Aug. 31, 2018

(87) PCT Pub. No.: WO2017/152065
PCT Pub. Date: Sep. 8, 2017

(65) Prior Publication Data
US 2021/0009770 A1 Jan. 14, 2021

(30) Foreign Application Priority Data
Mar. 3, 2016 (EP) .................................. 16382096

(51) Int. Cl.
*C08J 5/18* (2006.01)
*B29C 48/00* (2019.01)
(Continued)

(52) U.S. Cl.
CPC .............. *C08J 5/18* (2013.01); *B29C 48/0017* (2019.02); *B29C 48/08* (2019.02); *C08K 3/26* (2013.01);
(Continued)

(58) Field of Classification Search
CPC ...... C08L 23/06; C08L 23/0815; C08F 10/02; C08F 210/02; B29K 2023/0625
See application file for complete search history.

(56) References Cited

U.S. PATENT DOCUMENTS

| 5,064,802 A | 11/1991 | Stevens et al. |
| 5,153,157 A | 10/1992 | Hlatky et al. |
| (Continued) | | |

FOREIGN PATENT DOCUMENTS

| WO | 2014012250 A1 | 1/2014 |
| WO | 2015120401 A1 | 8/2015 |
| WO | 2015200741 A1 | 12/2015 |

OTHER PUBLICATIONS

Communication pursuant to Article 94(3) EPC, dated Apr. 17, 2019, related to European Patent Application No. 16382096.2.
(Continued)

*Primary Examiner* — Kregg T Brooks
(74) *Attorney, Agent, or Firm* — Dinsmore & Shohl LLP

(57) ABSTRACT

The present disclosure provides breathable films and method of making the same. The breathable films according to the present disclosure comprise a film layer comprising polymeric composition comprising equal to or less than 60 wt % of a linear low density polyethylene resin which exhibits each of the following properties: (1) a CEF fraction from 70 to 90 C of equal to or greater than 80% of the total CEF fractions; (2) a melt index, I2, measured according to ASTM D 1238 (2.16 kg @190C), in the range of equal to or greater than 2.0 g/10 min and equal to or less than 5.0 g/10 min; and (3) a melt flow ratio, I10/I2, of equal to or less than 6.7.

19 Claims, 6 Drawing Sheets

(51) Int. Cl.
  *B29C 48/08* (2019.01)
  *C08K 3/26* (2006.01)
  *C08L 23/06* (2006.01)
  *C08L 23/08* (2006.01)
  *C08L 23/12* (2006.01)
  *B29K 23/00* (2006.01)

(52) U.S. Cl.
  CPC ........... *C08L 23/06* (2013.01); *C08L 23/0815* (2013.01); *C08L 23/12* (2013.01); *B29K 2023/0625* (2013.01); *B29K 2995/005* (2013.01); *C08K 2003/265* (2013.01); *C08L 2207/066* (2013.01)

(56) References Cited

U.S. PATENT DOCUMENTS

| | | | |
|---|---|---|---|
| 5,296,433 A | 3/1994 | Siedle et al. | |
| 5,321,106 A | 6/1994 | Lapointe | |
| 5,350,723 A | 9/1994 | Neithamer et al. | |
| 5,425,872 A | 6/1995 | Devore et al. | |
| 5,625,087 A | 4/1997 | Neithamer et al. | |
| 5,721,185 A | 2/1998 | Lapointe et al. | |
| 5,783,512 A | 7/1998 | Jacobsen et al. | |
| 5,883,204 A | 3/1999 | Spencer et al. | |
| 5,919,983 A | 7/1999 | Rosen et al. | |
| 5,977,251 A | 11/1999 | Kao et al. | |
| 6,096,014 A | 8/2000 | Haffner et al. | |
| 6,103,657 A | 8/2000 | Murray | |
| 6,515,155 B1 | 2/2003 | Klosin et al. | |
| 6,696,379 B1 | 2/2004 | Carnahan et al. | |
| 7,163,907 B1 | 1/2007 | Canich et al. | |
| 8,372,931 B2 | 2/2013 | Hermel-Davidock et al. | |
| 2011/0039082 A1 | 2/2011 | Yun et al. | |
| 2016/0000615 A1 | 1/2016 | Larios et al. | |

OTHER PUBLICATIONS

Communication pursuant to Article 94(3) EPC, dated , related to European Patent Application No. 16382096.2, dated Nov. 25, 2019.
Monrabal et al, Macromol. Symp. 257, 71-79 (2007).
Karjala et al., "Detection of low levels of long-chain branching in polyolefins", Annual Technical Conference—Society of Plastics Engineers (2008), 66th 887-891.
International Search Report and Written Opinion pertaining to PCT/US2017/020681 dated May 8, 2017.
European Search Report pertaining to EP16382096 completed Aug. 24, 2016.
Chinese Search Report dated Nov. 18, 2020, related to Chinese Patent Application No. 201780011583.X.
Chinese Office Action, dated Nov. 27, 2020, related to Chinese Patent Application No. 201780011583.X.

BREATHABLE FILMS AND METHOD OF MAKING THE SAME

FIELD OF INVENTION

The instant invention relates to breathable films and method of making the same.

BACKGROUND OF THE INVENTION

The use of polyethylene compositions, such as linear low density polyethylenes in fabrication of breathable films is generally known. The typical process utilizes cast film extrusion process with machine direction orientation to produce breathable films. In such a process, a cast film is extruded and then it is oriented in machine direction until a desired basis weights (grams per square meter (GSM)) is achieved. It is difficult to achieve a homogenous film appearance at low levels of orientation because of localization of stresses, which can produce film defects such as tiger striping, i.e. stripes of highly deformed regions adjacent to strips of less deformed regions. Each film formulation has an intrinsic "minimum stretch ratio" required to achieve the desired final basis weight without tiger stripes. Only above this "minimum stretch ratio", the film optical appearance is acceptable. The film converter then fine tune the stretch ratio (above the minimum stretch ratio) to achieve the desired balance of mechanical performance. Formulations with a low "minimum stretch ratio" therefore offer a broad process window as well as a broad range of final film properties while minimizing film defects.

Despite efforts in developing linear low density polyethylene compositions suitable for breathable film production applications, there is still a need for a linear low density polyethylene composition having improved machine direction orientation, i.e. low "minimum stretch ratio," while providing improved breathable film properties such as improved water vapor transmission rate, shrinkage and puncture strength.

SUMMARY OF THE INVENTION

The present disclosure provides breathable films and method of making the same. In one embodiment, the present disclosure provides breathable films comprising a film layer comprising a polymeric composition comprising equal to or less than 60 wt % of a linear low density polyethylene resin which exhibits each of the following properties: (1) a CEF fraction from 70 to 90° C. of equal to or greater than 80% of the total CEF fractions; (2) a melt index, $I_2$, measured according to ASTM D 1238 (2.16 kg @190° C.), in the range of equal to or greater than 2.0 g/10 min and equal to or less than 5.0 g/10 min; and (3) a melt flow ratio, $I_{10}/I_2$, of equal to or less than 6.7.

In an alternative embodiment, the present disclosure further provides a method for producing a breathable film comprising: (a) cast extruding a polymeric composition which comprises from greater than 0 wt % to 60 wt % of the linear low density polyethylene which exhibits each of the following properties: (1) a CEF fraction from 70 to 90° C. of equal to or greater than 80% of the total CEF fractions; (2) a melt index, $I_2$, measured according to ASTM D 1238 (2.16 kg @190° C.), of equal to or greater than 2.0 g/10 min and equal to or less than 5 g/10 min; and (3) a melt flow ratio, $I_{10}/I_2$, of equal to or less than 6.7 to produce a cast extruded film layer; and (b) machine direction orienting the cast extruded film layer.

In an alternative embodiment, the present disclosure further provides a method for producing a breathable film comprising: (a) blow extruding a polymeric composition which comprises from greater than 0 wt % to 60 wt % of the linear low density polyethylene which exhibits each of the following properties: (1) a CEF fraction from 70 to 90° C. of equal to or greater than 80% of the total CEF fractions; (2) a melt index, $I_2$, measured according to ASTM D 1238 (2.16 kg @190° C.), of equal to or greater than 2.0 g/10 min and equal to or less than 5.0 g/10 min; and (3) a melt flow ratio, $I_{10}/I_2$, of equal to or less than 6.7 to produce a blown film layer; and (b) machine direction orienting the blown film layer.

In an alternative embodiment, the present disclosure further provides breathable films and method of making the same in accordance with any of the preceding embodiments, except that the linear low density polyethylene resin further exhibits a density (measured according to ASTM D792) from 0.915 to 0.940 g/cm$^2$.

In an alternative embodiment, the present disclosure further provides breathable films and method of making the same in accordance with any of the preceding embodiments, except that the linear low density polyethylene comprises units derived from ethylene and units derived from one or more α-olefin comonomers.

In an alternative embodiment, the present disclosure further provides breathable films and method of making the same in accordance with any of the preceding embodiments, except that the comonomer is 1-hexene.

In an alternative embodiment, the present disclosure further provides breathable films and method of making the same in accordance with any of the preceding embodiments, except that the comonomer is 1-octene.

In an alternative embodiment, the present disclosure further provides breathable films and method of making the same in accordance with any of the preceding embodiments, except that the comonomer is 1-butene.

In an alternative embodiment, the present disclosure further provides breathable films and method of making the same in accordance with any of the preceding embodiments, except that the linear low density polyethylene resin comprises no units derived from octene.

In an alternative embodiment, the present disclosure further provides breathable films and method of making the same in accordance with any of the preceding embodiments, except that the polymeric composition further comprises from 40 to 60 wt % $CaCO_3$.

In an alternative embodiment, the present disclosure further provides breathable films and method of making the same in accordance with any of the preceding embodiments, except that the polymeric composition comprises from 30 to 60 wt % linear low density polyethylene resin.

In an alternative embodiment, the present disclosure further provides breathable films and method of making the same in accordance with any of the preceding embodiments, except that the polymeric composition further comprises from greater than 0 to equal to or less than 5 wt % one or more compounds selected from the group consisting of pigments and antioxidants.

In an alternative embodiment, the present disclosure further provides breathable films and method of making the same in accordance with any of the preceding embodiments, except that the polymeric composition further comprises from greater than 0 to equal to or less than 10 wt % one or more compounds selected from the group consisting of polypropylene and low density polyethylene.

In an alternative embodiment, the present disclosure further provides breathable films and method of making the same in accordance with any of the preceding embodiments, except that at least one film layer comprises a polymeric composition comprising from 30 to 60 wt % of the linear low density polyethylene resin which exhibits each of the following properties: (1) a CEF fraction from 70 to 90° C. of equal to or greater than 80% of the total CEF fractions; (2) a melt index, $I_2$, measured according to ASTM D 1238 (2.16 kg @190° C.), of equal to or greater than 2.0 g/10 min and equal to or less than 5.0 g/10 min; and (3) a melt flow ratio, $I_{10}/I_2$, of equal to or less than 6.7.

In an alternative embodiment, the present disclosure further provides breathable films and method of making the same in accordance with any of the preceding embodiments, except that at least one film layer comprises a polymeric composition comprising (a) from 45 to 55 wt % of the linear low density polyethylene resin which exhibits each of the following properties: (1) a CEF fraction from 70 to 90° C. of equal to or greater than 80% of the total CEF fractions; (2) a melt index, $I_2$, measured according to ASTM D 1238 (2.16 kg @190° C.), of equal to or greater than 2.0 g/10 min and equal to or less than 5.0 g/10 min; and (3) a melt flow ratio, $I_{10}/I_2$, of equal to or less than 6.7; and (b) from 55 to 45 wt % $CaCO_3$.

In an alternative embodiment, the present disclosure further provides breathable films and method of making the same in accordance with any of the preceding embodiments, except that the machine direction orienting is conducted with a stretch ratio of equal to or greater than 1.5.

In an alternative embodiment, the present disclosure further provides breathable films and method of making the same in accordance with any of the preceding embodiments, except that the breathable films comprise one or more additional film layers.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

DETAILED DESCRIPTION OF THE INVENTION

Figure 1:
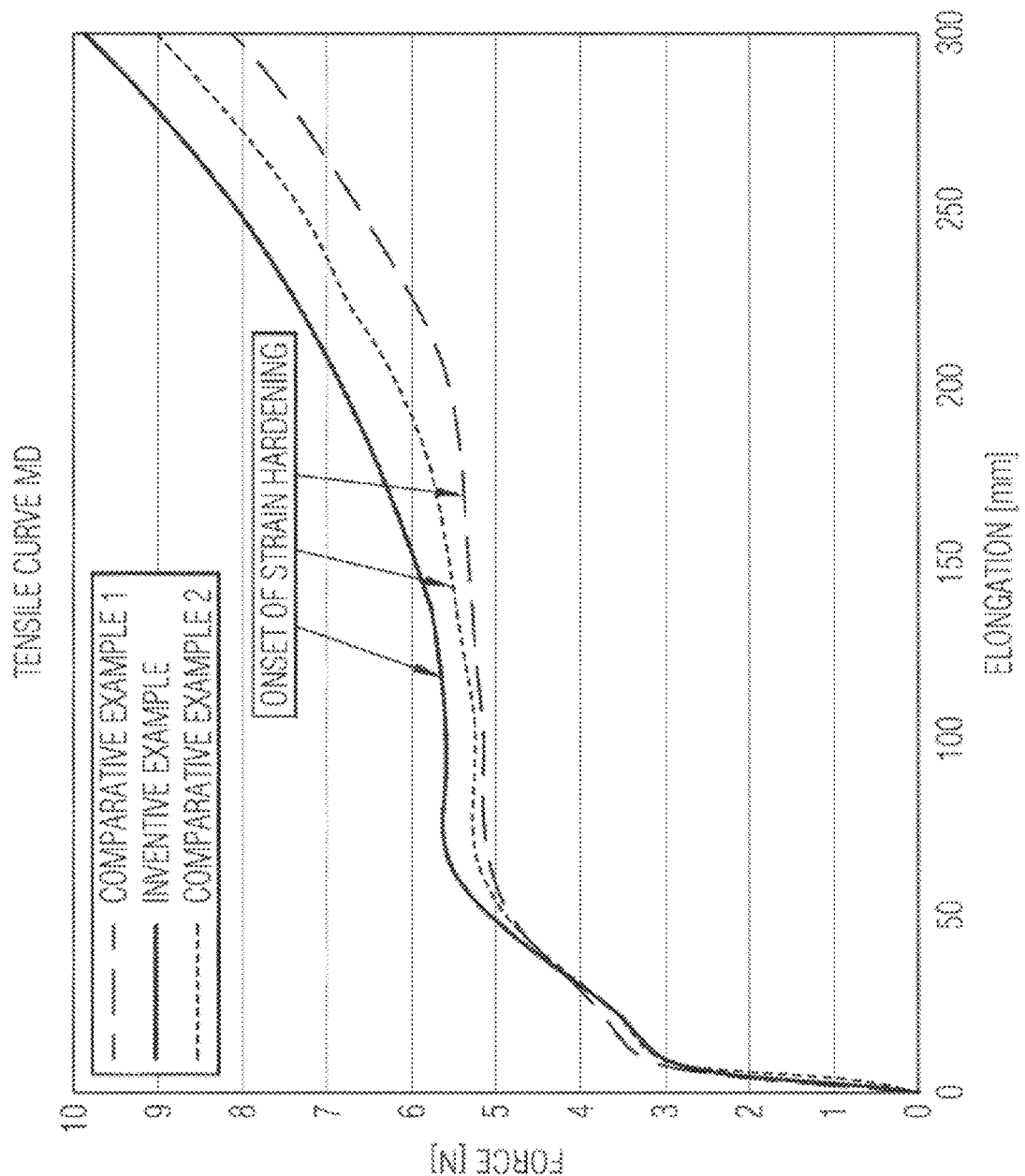
FIG. 1 is a graph illustrating tensile curve properties in machine direction of films formed from the inventive and comparative composition, measured according to ISO 527-3.

The present disclosure provides breathable films and method of making the same. The breathable films according to the present disclosure comprise a film layer comprising polymeric composition comprising equal to or less than 60 wt % of a linear low density polyethylene resin which exhibits each of the following properties: (1) a CEF fraction from 70 to 90° C. of equal to or greater than 80% of the total CEF fractions; (2) a melt index, $I_2$, measured according to ASTM D 1238 (2.16 kg @190° C.), in the range of equal to or greater than 2.0 g/10 min and equal to or less than 5.0 g/10 min; and (3) a melt flow ratio, $I_{10}/I_2$, of equal to or less than 6.7.

The method for producing a breathable film according to the present disclosure comprises: (a) cast extruding a polymeric composition which comprises from greater than 0 wt % to 60 wt % of the linear low density polyethylene which exhibits each of the following properties: (1) a CEF fraction from 70 to 90° C. of equal to or greater than 80% of the total CEF fractions; (2) a melt index, $I_2$, measured according to ASTM D 1238 (2.16 kg @190° C.), of equal to or greater than 2.0 g/10 min and equal to or less than 5.0 g/10 min; and (3) a melt flow ratio, $I_1/I_2$, of equal to or less than 6.7 to produce a cast extruded film layer; and (b) machine direction orienting the cast extruded film layer.

In an alternative embodiment, the method for producing a breathable film according to the present disclosure comprises: (a) blow extruding a polymeric composition which comprises from greater than 0 wt % to 60 wt % of the linear low density polyethylene which exhibits each of the following properties: (1) a CEF fraction from 70 to 90° C. of equal to or greater than 80% of the total CEF fractions; (2) a melt index, 12, measured according to ASTM D 1238 (2.16 kg @190° C.), of equal to or greater than 2.0 g/10 min and equal to or less than 5.0 g/10 min; and (3) a melt flow ratio, $I_{10}/I_2$, of equal to or less than 6.7 to produce a blown film layer; and (b) machine direction orienting the blown film layer.

The polymeric composition comprises 60 percent or less by weight of a linear low density polyethylene, further described below, based on the weight of the polymeric composition, for example, from 30 to 60 weight percent by weight of by weight of a linear low density polyethylene, based on the weight of the polymeric composition. The polymeric composition comprises from 40 to 60 percent by weight of $CaCO_3$, based on the weight of the polymeric composition. The polymeric composition may further comprise 10 percent or less by weight a low density polyethylene or a polypropylene, based on the weight of the polymeric composition.

The polymeric composition may further comprise additional components such as one or more additives. Such additives include, but are not limited to, antistatic agents, color enhancers, dyes, lubricants, fillers such as $TiO_2$, opacifiers, nucleators, processing aids, pigments, primary antioxidants, secondary antioxidants, processing aids, UV stabilizers, anti-blocks, slip agents, tackifiers, fire retardants, anti-microbial agents, odor reducer agents, anti-fungal agents, and combinations thereof. The polymeric composition may contain from about 0.1 to about 10 percent by the combined weight of such additives, based on the weight of the polymeric composition including such additives.

Linear Low Density Polyethylene

The linear low density polyethylene (LLDPE) exhibits each of the following properties: (1) a CEF fraction from 70 to 90° C. of equal to or greater than 80% of the total CEF fractions; (2) a melt index, $I_2$, measured according to ASTM D 1238 (2.16 kg @190° C.), in the range of equal to or greater than 2.0 g/10 min and equal to or less than 5.0 g/10 min; and (3) a melt flow ratio, $I_{10}/I_2$, of equal to or less than 6.7.

The linear low density polyethylene (LLDPE) comprises an ethylene/α-olefin copolymer comprising (a) less than or equal to 60 percent, for example, at least 70 percent, or at least 80 percent, or at least 90 percent, by weight of the units derived from ethylene; and (b) less than 30 percent, for example, less than 25 percent, or less than 20 percent, or less than 10 percent, by weight of units derived from one or more α-olefin comonomers. The term "ethylene/α-olefin copolymer" refers to a polymer that contains more than 50 mole percent polymerized ethylene monomer (based on the total amount of polymerizable monomers) and at least one other comonomer. In a particular embodiment, the ethylene/α-olefin copolymer has units derived from ethylene and units derived from two different α-olefin comonomers.

The α-olefin comonomers typically have no more than 20 carbon atoms. For example, the α-olefin comonomers may preferably have 3 to 8 carbon atoms, and more preferably 3 to 6 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may, for example, be selected from the group consisting of propylene, 1-butene, 1-hexene, or in the alternative, from the group consisting of 1-butene and 1-hexene. In one embodiment, the linear low density polyethylene resin comprises no units derived from 1-octene.

The LLDPE has a melt index, $I_2$, measured according to ASTM D 1238 (2.16 kg @190° C.), in the range of equal to or greater than 2.0 g/10 min and equal to or less than 5.0 g/10 min. All individual values and subranges from 2.0 to 5.0 g/10 min are included and disclosed herein; for example, the $I_2$ may range from a lower limit of 2.0, 3.0 or 4.0 g/10 min to an upper limit of 3.0, 4.0 or 5.0 g/10 min. For example, the 12 may be from 2.0 to 5.0 g/10 min, or in the alternative, 2.0 to 3.5 g/10 min, or in the alternative, 3.5 to 5.0 g/10 min, or in the alternative, 3.0 to 4.0 g/10 min.

The LLDPE is characterized by having a zero shear viscosity ratio (ZSVR) in the range of from 1.2 to 5.0. All individual values and subranges form 1.2 to 5.0 are included and disclosed herein; for example, the ZSVR can range from a lower limit of 1.2, 1.4, 1.6, 1.8 to an upper limit of 2.0, 3.0, 4.0 or 5.0. For example, the ZSVR may range from 1.2 to 5.0, or in the alternative, from 1.5 to 4, or in the alternative, from 1.8 to 3.5.

The LLDPE has a density in the range of 0.915 to 0.940 g/cm³, for example from 0.915 to 0.925 g/cm³. All individual values and subranges from 0.915 to 0.940 g/cm³ are included and disclosed herein; for example, the density can range from a lower limit of 0.915, 0.920, 0.925, 0.930 or 0.935 g/cm³ to an upper limit of 0.917, 0.922, 0.927, 0.932, 0.937 or 0.940 g/cm³. For example, the density can be from 0.915 to 0.940 g/cm³, or in the alternative, from 0.915 to 0.927 g/cm³, or in the alternative, from 0.927 to 0.940 g/cm³, or in the alternative, from 0.915 to 0.921 g/cm³.

The LLDPE has a molecular weight distribution ($M_w/M_n$) in the range of from 2.0 to 3.5. All individual values and subranges from 2.0 to 3.5 are included and disclosed herein; for example, the molecular weight distribution ($M_w/M_n$) can range from a lower limit of 2, 2.1, 2.2, 2.4, 2.5, or 2.6 to an upper limit of 2.2, 2.3, 2.4, 2.5, 2.7, 2.9, 3.2, or 3.5. For example, the molecular weight distribution ($M_w/M_n$) can be from 2.0 to 3.5, or in the alternative, from 2.0 to 2.4, or in the alternative, from 2.0 to 2.8, or in the alternative, from 2.8 to 3.5.

The LLDPE has a molecular weight distribution ($M_z/M_n$) in the range of from 3.5 to 6. All individual values and subranges from 3.5 to 6 are included and disclosed herein; for example, the molecular weight distribution ($M_z/M_n$) can be from a lower limit of 3.5, 3.7, 3.9, 4.5 or 5 to an upper limit of 3.5, 4.0, 4.2, 4.4, 4.7, 5.0, 5.5 or 6.0. For example, the molecular weight distribution ($M_z/M_n$) can range from 3.5 to 6, or in the alternative, from 3.5 to 4.8, or in the alternative, from 4.8 to 6, or in the alternative, from 4 to 5, or in the alternative, from 3.5 to 4.5.

The LLDPE has a molecular weight distribution asymmetry $[(M_w/M_n)/(M_z/M_w)]$ i.e. $M_w^2/(M_n*M_z)$ in the range of from 1.00 to 1.40. For example, the molecular weight distribution asymmetry $M_w^2/(M_n*M_z)$ can be from a lower limit of 1.0, 1.05, 1.10, 1.15 or 1.20 to an upper limit of 1.25, 1.30, 1.35, or 1.40. For example, the molecular weight distribution asymmetry $M_w^2/(M_n*M_z)$ can range from 1.00 to 1.40, or in the alternative, from 1.00 to 1.20, or in the alternative, from 1.20 to 1.40, or in the alternative, from 1.10 to 1.30.

The LLDPE has a vinyl unsaturation of less than 150 vinyls per one million carbon atoms present in the backbone of the LLDPE. All individual values and subranges from less than 150 vinyls per one million carbon atoms are included and disclosed herein; for example, the vinyl unsaturation can be less than 150, or in the alternative, less than 120, or in the alternative, less than 80, or in the alternative, less than 50 vinyls per one million carbon atoms present in the backbone of the LLDPE.

The LLDPE has a heat of crystallization in the range of from 135 to 145 J/g. All individual values and subranges from 135 to 145 J/g are included and disclosed herein; for examples, the heat of crystallization can be from a lower limit of 135, 136, 137, or 138 J/g to an upper limit of 140, 141, 143, or 145 J/g. For example, the heat of crystallization can be in the range of from 135 to 145 J/g, or in the alternative, from 135 to 140 J/g, or in the alternative, from 140 to 145 J/g, or in the alternative, from 137 to 142 J/g.

The LLDPE has a peak crystallization temperature in the range of from 94 to 101° C. All individual values and subranges from 94 to 101° C. are included and disclosed herein; for examples, the peak crystallization temperature can be from a lower limit of 94, 95, 96, or 97° C. to an upper limit of 98, 99, 100, or 101° C. For example, the peak crystallization temperature can be from 94 to 101° C., or in the alternative, from 94 to 97° C., or in the alternative, from 97 to 101° C., or in the alternative, from 95 to 99° C.

The LLDPE has a heat of melting in the range of 135 to 145 J/g. All individual values and subranges from 135 to 145 J/g are included and disclosed herein; for examples, the heat of melting can be from a lower limit of 135, 136, 137, or 138 J/g to an upper limit of 140, 141, 143, or 145 J/g. For example, the heat of melting can be from 135 to 145 J/g, or in the alternative, from 135 to 140 J/g, or in the alternative, from 140 to 145 J/g, or in the alternative, from 137 to 142 J/g.

The LLDPE has a peak melting temperature in the range of 108 to 116° C. All individual values and subranges from 94 to 101° C. are included and disclosed herein; for examples, the peak melting temperature can be from a lower limit of 108, 109, 110, or 11° C. to an upper limit of 113, 114, 115, or 116° C. For example, the peak melting temperature can be from 108 to 116° C., or in the alternative, from 108 to 112° C., or in the alternative, from 112 to 116° C., or in the alternative, from 110 to 114° C.

In one embodiment, the LLDPE comprises less than or equal to 100 parts, for example, less than 10 parts, less than 8 parts, less than 5 parts, less than 4 parts, less than 1 parts, less than 0.5 parts, or less than 0.1 parts, by weight of metal complex residues remaining from a catalyst system comprising a metal complex of a polyvalent aryloxyether per one million parts of the LLDPE. The metal complex residues remaining from the catalyst system comprising a metal complex of a polyvalent aryloxyether in the LLDPE may be measured by x-ray fluorescence (XRF), which is calibrated to reference standards. The polymer resin granules can be compression molded at elevated temperature into plaques having a thickness of about ⅜ of an inch for the x-ray measurement in a preferred method. At very low concentrations of metal complex, such as below 0.1 ppm, ICP-AES would be a suitable method to determine metal complex residues present in the LLDPE.

The LLDPE may further comprise additional components such as one or more other polymers and/or one or more additives. Such additives include, but are not limited to, antistatic agents, color enhancers, dyes, lubricants, fillers such as $TiO_2$ or $CaCO_3$, opacifiers, nucleators, processing aids, pigments, primary antioxidants, secondary antioxidants, processing aids, UV stabilizers, anti-blocks, slip agents, tackifiers, fire retardants, anti-microbial agents, odor reducer agents, anti-fungal agents, and combinations thereof. The LLDPE may contain from about 0.1 to about 10 percent by the combined weight of such additives, based on the weight of the LLDPE including such additives.

Any conventional ethylene (co)polymerization solution single reactor reaction processes may be employed to produce the LLDPE. One method of making the LLDPE disclosed herein is described in detail in U.S. Pat. No. 5,977,251, the disclosure of which is incorporated herein by reference in its entirety.

In one embodiment, the LLDPE is prepared via a polymerization process in a single solution phase loop reactor system, wherein the catalyst system comprises (a) one or more procatalysts comprising a metal-ligand complex of formula (I) below:

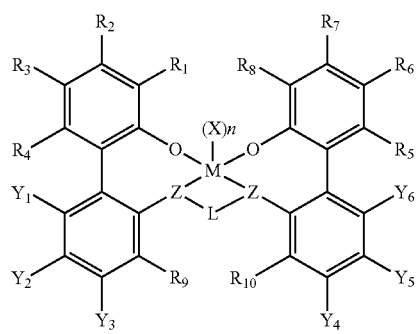

(I)

M is titanium, zirconium, or hafnium, each independently being in a formal oxidation state of +2, +3, or +4; and n is an integer of from 0 to 3, and wherein when n is 0, X is absent; and each X independently is a monodentate ligand that is neutral, monoanionic, or dianionic; or two Xs are taken together to form a bidentate ligand that is neutral, monoanionic, or dianionic; and X and n are chosen in such a way that the metal-ligand complex of formula (I) is, overall, neutral; and each Z independently is O, S, $N(C_1-C_{40})$hydrocarbyl, or $P(C_1-C_{40})$hydrocarbyl;

L is $(C_2-C_{40})$hydrocarbylene or $(C_2-C_{40})$heterohydrocarbylene, wherein the $(C_2-C_{40})$hydrocarbylene has a portion that comprises a 2-carbon atom to 10-carbon atom linker backbone linking the Z atoms in formula (I) (to which L is bonded) and the $(C_2-C_{40})$heterohydrocarbylene has a portion that comprises a 3-atom to 10-atom linker backbone linking the Z atoms in formula (I), wherein each of the 3 to 10 atoms of the 3-atom to 10-atom linker backbone of the $(C_2-C_{40})$heterohydrocarbylene independently is a carbon atom or heteroatom, wherein each heteroatom independently is O, S, S(O), $S(O)_2$, $Si(R^C)_2$, $Ge(R^C)_2$, $P(R^P)$, or $N(R^N)$, wherein independently each $R^C$ is selected from the group consisting of $(C_1-C_{40})$hydrocarbyl. As used herein, the $R^C$ includes the situation wherein two $R^C$ groups are joined together to form a diradical ring in and wherein the Si is within the ring. Each $R^P$ is $(C_1-C_{40})$hydrocarbyl; and each $R^N$ is $(C_1-C_{40})$hydrocarbyl or absent; and $R_{1-10}$ are each independently selected from the group consisting of a $(C_1-C_{40})$hydrocarbyl, $(C_1-C_{40})$heterohydrocarbyl, $Si(R^C)_3$, $Ge(R^C)_3$, $P(R^P)_2$, $N(R^N)_2$, $OR^C$, $SR^C$, $NO_2$, CN, $CF_3$, $R^CS(O)$—, $R^CS(O)_2$—, $(R^C)_2C=N$—, $R^CC(O)O$—, $R^COC(O)$—, $R^CC(O)N(R)$—, $(R^C)_2NC(O)$—, halogen atom, hydrogen atom, and any combination thereof, and at least two of $Y_1$-$Y_3$ and at least two of $Y_4$-$Y_6$ are fluorine atoms and when only two of $Y_1$-$Y_3$ and only two of $Y_4$-$Y_6$ are fluorine atoms, the non-flourine $Y_1$-$Y_6$ are selected from the group consisting of H atom, alkyl groups, aryl groups, heteroaryl groups, and alkoxy groups, and optionally two or more R groups of the $R_{1-10}$ groups (for example, from $R_{1-4}$, $R_{5-8}$) can combine together into ring structures with such ring structures having from 2 to 50 atoms in the ring excluding any hydrogen atoms.

As used herein, the term "$(C_x-C_y)$hydrocarbyl" means a hydrocarbon radical of from x to y carbon atoms and the term "$(C_x-C_y)$hydrocarbylene" means a hydrocarbon diradical of from x to y carbon atoms and the term "$(C_x-C_y)$alkyl" means an alkyl group of from x to y carbon atoms and the term "$(C_x-C_y)$cycloalkyl" means a cycloalkyl group of from x to y carbon atoms.

As used herein, the term "$(C_1-C_{40})$hydrocarbyl" means a hydrocarbon radical of from 1 to 40 carbon atoms and the term "$(C_2-C_{40})$hydrocarbylene" means a hydrocarbon diradical of from 2 to 40 carbon atoms, wherein each hydrocarbon radical and diradical independently is aromatic (6 carbon atoms or more) or non-aromatic, saturated or unsaturated, straight chain or branched chain, cyclic (including mono- and poly-cyclic, fused and non-fused polycyclic, including bicyclic; 3 carbon atoms or more) or acyclic, or a combination of two or more thereof; and each hydrocarbon radical and diradical independently is the same as or different from another hydrocarbon radical and diradical, respectively, and independently is unsubstituted or substituted by one or more $R^S$.

Preferably, a $(C_1-C_{40})$hydrocarbyl independently is an unsubstituted or substituted $(C_1-C_{40})$alkyl, $(C_3-C_{40})$cycloalkyl, $(C_3-C_{20})$cycloalkyl-$(C_1-C_{20})$alkylene, $(C_6-C_{40})$aryl, or $(C_6-C_{20})$aryl-$(C_1-C_{20})$alkylene. More preferably, each of the aforementioned $(C_1-C_{40})$hydrocarbyl groups independently has a maximum of 20 carbon atoms (i.e., $(C_1-C_{20})$hydrocarbyl), and still more preferably a maximum of 12 carbon atoms.

The terms "$(C_1-C_{40})$alkyl" and "$(C_1-C_{18})$alkyl" mean a saturated straight or branched hydrocarbon radical of from 1 to 40 carbon atoms or from 1 to 18 carbon atoms, respectively, that is unsubstituted or substituted by one or more $R^S$. Examples of unsubstituted $(C_1-C_{40})$alkyl are unsubstituted $(C_1-C_{20})$alkyl; unsubstituted $(C_1-C_{10})$alkyl; unsubstituted $(C_1-C_5)$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted $(C_1-C_{40})$alkyl are substituted $(C_1-C_{20})$alkyl, substituted $(C_1-C_{10})$alkyl, trifluoromethyl, and $(C_{45})$alkyl. The $(C_{45})$alkyl is, for example, a $(C_{27}-C_{40})$alkyl substituted by one $R^S$, which is a $(C_{18}-C_5)$alkyl, respectively. Preferably, each $(C_1-C_5)$alkyl independently is methyl, trifluoromethyl, ethyl, 1-propyl, 1-methylethyl, or 1,1-dimethylethyl.

The term "$(C_6-C_{40})$aryl" means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic ring carbon atoms, and the mono-, bi- or tricyclic radical comprises 1, 2 or 3 rings, respectively; wherein the 1 ring is aromatic and the 2 or 3 rings independently are fused or non-fused and at least one of the 2 or 3 rings is aromatic. Examples of unsubstituted $(C_6-C_{40})$aryl are unsubstituted $(C_6-C_{20})$aryl; unsubstituted $(C_6-C_{18})$aryl; 2-$(C_1-O_5)$alkyl-phenyl; 2,4-bis$(C_1-C_5)$alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted $(C_6-C_{40})$aryl are substituted $(C_6-C_{20})$aryl; substituted $(C_6-C_{18})$aryl; 2,4-bis[$(C_{20})$alkyl]-phenyl; polyfluorophenyl; pentafluorophenyl; and fluoren-9-one-1-yl.

The term "$(C_3-C_{40})$cycloalkyl" means a saturated cyclic hydrocarbon radical of from 3 to 40 carbon atoms that is unsubstituted or substituted by one or more $R^S$. Other cycloalkyl groups (e.g., $(C_3-C_{12})$cycloalkyl)) are defined in an analogous manner. Examples of unsubstituted $(C_3-C_{40})$ cycloalkyl are unsubstituted $(C_3-C_{20})$cycloalkyl, unsubstituted $(C_3-C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3-C_{40})$cycloalkyl are substituted $(C_3-C_{20})$cycloalkyl, substituted $(C_3-C_{10})$cycloalkyl, cyclopentanon-2-yl, and 1-fluorocyclohexyl.

Examples of $(C_1-C_{40})$hydrocarbylene are unsubstituted or substituted $(C_6-C_{40})$arylene, $(C_3-C_{40})$cycloalkylene, and $(C_1-C_{40})$alkylene (e.g., $(C_1-C_{20})$alkylene). In some embodiments, the diradicals are on a same carbon atom (e.g., —CH$_2$—) or on adjacent carbon atoms (i.e., 1,2-diradicals), or are spaced apart by one, two, or more intervening carbon atoms (e.g., respective 1,3-diradicals, 1,4-diradicals, etc.). Preferred is a 1,2-, 1,3-, 1,4-, or an alpha,omega-diradical, and more preferably a 1,2-diradical. The alpha, omega-diradical is a diradical that has maximum carbon backbone spacing between the radical carbons. More preferred is a 1,2-diradical, 1,3-diradical, or 1,4-diradical version of $(C_6-C_{18})$arylene, $(C_3-C_{20})$cycloalkylene, or $(C_2-C_{20})$alkylene.

The term "$(C_3-C_{40})$cycloalkylene" means a cyclic diradical (i.e., the radicals are on ring atoms) of from 3 to 40 carbon atoms that is unsubstituted or substituted by one or more $R^S$. Examples of unsubstituted $(C_3-C_{40})$cycloalkylene are 1,3-cyclopropylene, 1,1-cyclopropylene, and 1,2-cyclohexylene. Examples of substituted $(C_3-C_{40})$cycloalkylene are 2-oxo-1,3-cyclopropylene and 1,2-dimethyl-1,2-cyclohexylene.

The term "$(C_1-C_{40})$heterohydrocarbyl" means a heterohydrocarbon radical of from 1 to 40 carbon atoms and the term "$(C_1-C_{40})$heterohydrocarbylene" means a heterohydrocarbon diradical of from 1 to 40 carbon atoms, and each heterohydrocarbon independently has one or more heteroatoms O; S; S(O); S(O)$_2$; Si($R^C$)$_2$; Ge($R^C$)$_2$; P($R^P$); and N($R^N$), wherein independently each $R^C$ is unsubstituted $(C_1-C_{40})$hydrocarbyl, each $R^P$ is unsubstituted $(C_1-C_{40})$hydrocarbyl; and each $R^N$ is unsubstituted $(C_1-C_{40})$hydrocarbyl or absent (e.g., absent when N comprises —N═ or tri-carbon substituted N). The heterohydrocarbon radical and each of the heterohydrocarbon diradicals independently is on a carbon atom or heteroatom thereof, although preferably is on a carbon atom when bonded to a heteroatom in formula (I) or to a heteroatom of another heterohydrocarbyl or heterohydrocarbylene. Each $(C_1-C_{40})$heterohydrocarbyl and $(C_1-C_{40})$heterohydrocarbylene independently is unsubstituted or substituted (by one or more $R^S$), aromatic or non-aromatic, saturated or unsaturated, straight chain or branched chain, cyclic (including mono- and poly-cyclic, fused and non-fused polycyclic) or acyclic, or a combination of two or more thereof; and each is respectively the same as or different from another.

Preferably, the $(C_1-C_{40})$heterohydrocarbyl independently is unsubstituted or substituted $(C_1-C_{40})$heteroalkyl, $(C_1-C_{40})$hydrocarbyl-O—, $(C_1-C_{40})$hydrocarbyl-S—, $(C_1-C_{40})$hydrocarbyl-S(O)—, $(C_1-C_{40})$hydrocarbyl-S(O)$_2$—, $(C_1-C_{40})$hydrocarbyl-Si($R^C$)$_2$—, $(C_1-C_{40})$hydrocarbyl-Ge($R^C$)$_2$—, $(C_1-C_{40})$hydrocarbyl-N($R^N$)—, $(C_1-C_{40})$hydrocarbyl-P($R^P$)—, $(C_2-C_{40})$heterocycloalkyl, $(C_2-C_{19})$heterocycloalkyl-$(C_1-C_{20})$alkylene, $(C_3-C_{20})$cycloalkyl-$(C_1-C_{19})$heteroalkylene, $(C_2-C_{19})$heterocycloalkyl-$(C_1-C_{20})$heteroalkylene, $(C_1-C_{40})$heteroaryl, $(C_1-C_{19})$heteroaryl-$(C_1-C_{20})$alkylene, $(C_6-C_{20})$aryl-$(C_1-C_{19})$heteroalkylene, or $(C_1-C_{19})$heteroaryl-$(C_1-C_{20})$heteroalkylene. The term "$(C_1-C_{40})$heteroaryl" means an unsubstituted or substituted (by one or more $R^S$) mono-, bi- or tricyclic heteroaromatic hydrocarbon radical of from 1 to 40 total carbon atoms and from 1 to 4 heteroatoms, and the mono-, bi- or tricyclic radical comprises 1, 2 or 3 rings, respectively, wherein the 2 or 3 rings independently are fused or non-fused and at least one of the 2 or 3 rings is heteroaromatic. Other heteroaryl groups (e.g., $(C_4-C_{12})$heteroaryl)) are defined in an analogous manner. The monocyclic heteroaromatic hydrocarbon radical is a 5-membered or 6-membered ring. The 5-membered ring has from 1 to 4 carbon atoms and from 4 to 1 heteroatoms, respectively, each heteroatom being O, S, N, or P, and preferably O, S, or N. Examples of 5-membered ring heteroaromatic hydrocarbon radical are pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring has 4 or 5 carbon atoms and 2 or 1 heteroatoms, the heteroatoms being N or P, and preferably N. Examples of 6-membered ring heteroaromatic hydrocarbon radical are pyridine-2-yl; pyrimidin-2-yl; and pyrazin-2-yl. The bicyclic heteroaromatic hydrocarbon radical preferably is a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical preferably is a fused 5,6,5-;

5,6,6-; 6,5,6-; or 6,6,6-ring system. An example of the fused 5,6,5-ring system is 1,7-dihydropyrrolo[3,2f]indol-1-yl. An example of the fused 5,6,6-ring system is 1H-benzo[f]indol-1-yl. An example of the fused 6,5,6-ring system is 9H-carbazol-9-yl. An example of the fused 6,6,6-ring system is acrydin-9-yl.

In some embodiments the $(C_1-C_{40})$heteroaryl is 2,7-disubstituted carbazolyl or 3,6-disubstituted carbazolyl or unsubstituted carbazoles, more preferably wherein each $R^S$ independently is phenyl, methyl, ethyl, isopropyl, or tertiary-butyl, still more preferably 2,7-di(tertiary-butyl)-carbazolyl, 3,6-di(tertiary-butyl)-carbazolyl, 2,7-di(tertiary-octyl)-carbazolyl, 3,6-di(tertiary-octyl)-carbazolyl, 2,7-diphenylcarbazolyl, 3,6-diphenylcarbazolyl, 2,7-bis(2,4,6-trimethylphenyl)-carbazolyl or 3,6-bis(2,4,6-trimethylphenyl)-carbazolyl.

The aforementioned heteroalkyl and heteroalkylene groups are saturated straight or branched chain radicals or diradicals, respectively, containing $(C_1-C_{40})$ carbon atoms, or fewer carbon atoms as the case may be, and one or more of the heteroatoms $Si(R^C)_2$, $Ge(R^C)_2$, $P(R^P)$, $N(R^N)$, N, O, S, S(O), and $S(O)_2$ as defined above, wherein each of the heteroalkyl and heteroalkylene groups independently are unsubstituted or substituted by one or more $R^S$.

Examples of unsubstituted $(C_2-C_{40})$heterocycloalkyl are unsubstituted $(C_2-C_{20})$heterocycloalkyl, unsubstituted $(C_2-C_{10})$heterocycloalkyl, aziridin-1-yl, oxetan-2-yl, tetrahydrofuran-3-yl, pyrrolidin-1-yl, tetrahydrothiophen-S,S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

The term "halogen atom" means fluorine atom (F), chlorine atom (Cl), bromine atom (Br), or iodine atom (I) radical. Preferably each halogen atom independently is the Br, F, or Cl radical, and more preferably the F or Cl radical. The term "halide" means fluoride (F⁻), chloride (Cl⁻), bromide (Br⁻), or iodide (I⁻) anion.

Unless otherwise indicated herein the term "heteroatom" means O, S, S(O), $S(O)_2$, $Si(R^C)_2$, $Ge(R^C)_2$, $P(R^P)$, or $N(R^N)$, wherein independently each $R^C$ is unsubstituted $(C_1-C_{40})$hydrocarbyl, each $R^P$ is unsubstituted $(C_1-C_{40})$hydrocarbyl; and each $R^N$ is unsubstituted $(C_1-C_{40})$hydrocarbyl or absent (absent when N comprises —N═). Preferably, there are no O—O, S—S, or O—S bonds, other than O—S bonds in an S(O) or $S(O)_2$ diradical functional group, in the metal-ligand complex of formula (I). More preferably, there are no O—O, N—N, P—P, N—P, S—S, or O—S bonds, other than O—S bonds in an S(O) or $S(O)_2$ diradical functional group, in the metal-ligand complex of formula (I).

Preferably, there are no O—O, S—S, or O—S bonds, other than O—S bonds in an S(O) or $S(O)_2$ diradical functional group, in the metal-ligand complex of formula (I). More preferably, there are no O—O, N—N, P—P, N—P, S—S, or O—S bonds, other than O—S bonds in an S(O) or $S(O)_2$ diradical functional group, in the metal-ligand complex of formula (I).

The term "saturated" means lacking carbon-carbon double bonds, carbon-carbon triple bonds, and (in heteroatom-containing groups) carbon-nitrogen, carbon-phosphorous, and carbon-silicon double or triple bonds. Where a saturated chemical group is substituted by one or more substituents $R^S$, one or more double and/or triple bonds optionally may or may not be present in substituents $R^S$. The term "unsaturated" means containing one or more carbon-carbon double bonds, carbon-carbon triple bonds, and (in heteroatom-containing groups) carbon-nitrogen, carbon-phosphorous, and carbon-silicon double bonds or triple bonds, not including any such double bonds that may be present in substituents $R^S$, if any, or in (hetero)aromatic rings, if any.

M is titanium, zirconium, or hafnium. In one embodiment, M is zirconium or hafnium, and in another embodiment M is hafnium. In some embodiments, M is in a formal oxidation state of +2, +3, or +4. In some embodiments, n is 0, 1, 2, or 3. Each X independently is a monodentate ligand that is neutral, monoanionic, or dianionic; or two Xs are taken together to form a bidentate ligand that is neutral, monoanionic, or dianionic. X and n are chosen in such a way that the metal-ligand complex of formula (I) is, overall, neutral. In some embodiments each X independently is the monodentate ligand. In one embodiment when there are two or more X monodentate ligands, each X is the same. In some embodiments the monodentate ligand is the monoanionic ligand. The monoanionic ligand has a net formal oxidation state of −1. Each monoanionic ligand may independently be hydride, $(C_1-C_{40})$hydrocarbyl carbanion, $(C_1-C_{40})$heterohydrocarbyl carbanion, halide, nitrate, carbonate, phosphate, sulfate, HC(O)O⁻, $(C_1-C_{40})$hydrocarbylC(O)O⁻, HC(O)N(H)⁻, $(C_1-C_{40})$hydrocarbylC(O)N(H)⁻, $(C_1-C_{40})$hydrocarbylC(O)N(($C_1-C_{20}$)hydrocarbyl)⁻, $R^K R^L B^-$, $R^K R^L N^-$, $R^K O^-$, $R^K S^-$, $R^K R^L P^-$, or $R^M R^K R^L Si^-$, wherein each $R^K$, $R^L$, and $R^M$ independently is hydrogen, $(C_1-C_{40})$hydrocarbyl, or $(C_1-C_{40})$heterohydrocarbyl, or $R^K$ and $R^L$ are taken together to form a $(C_2-C_{40})$hydrocarbylene or $(C_1-C_{40})$heterohydrocarbylene and $R^M$ is as defined above.

Co-Catalyst Component

The procatalyst comprising the metal-ligand complex of formula (I) may be rendered catalytically active, in some embodiments, by contacting it to, or combining it with, the activating co-catalyst or by using an activating technique such as those that are known in the art for use with metal-based olefin polymerization reactions. Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Aluminoxanes and their preparations are known at, for example, U.S. Pat. No. 6,103,657. Examples of preferred polymeric or oligomeric alumoxanes are methylalumoxane, triisobutylaluminum-modified methylalumoxane, and isobutylalumoxane.

Exemplary Lewis acid activating co-catalysts are Group 13 metal compounds containing from 1 to 3 hydrocarbyl substituents as described herein. In some embodiments, exemplary Group 13 metal compounds are tri(hydrocarbyl)-substituted-aluminum or tri(hydrocarbyl)-boron compounds. In some other embodiments, exemplary Group 13 metal compounds are tri(hydrocarbyl)-substituted-aluminum or tri(hydrocarbyl)-boron compounds are tri(($C_1-C_{10}$)alkyl)aluminum or tri(($C_6-C_{18}$)aryl)boron compounds and halogenated (including perhalogenated) derivatives thereof. In some other embodiments, exemplary Group 13 metal compounds are tris(fluoro-substituted phenyl)boranes, in other embodiments, tris(pentafluorophenyl)borane. In some embodiments, the activating co-catalyst is a tris(($C_1-C_{20}$)hydrocarbyl) borate (e.g., trityl tetrafluoroborate) or a tri $((C_1-C_{20})$hydrocarbyl)ammonium tetra$((C_1-C_{20})$hydrocarbyl)borane (e.g., bis(octadecyl)methylammonium tetrakis (pentafluorophenyl)borane). As used herein, the term "ammonium" means a nitrogen cation that is a $((C_1-C_{20})$hydrocarbyl)$_4$N$^+$, a $((C_1-C_{20})$hydrocarbyl)$_3$N(H)$^+$, a $((C_1-C_{20})$hydrocarbyl)$_2$N(H)$_2^+$, $(C_1-C_{20})$hydrocarbylN(H)$_3^+$, or N(H)$_4^+$, wherein each $(C_1-C_{20})$hydrocarbyl may be the same or different.

Exemplary combinations of neutral Lewis acid activating co-catalysts include mixtures comprising a combination of a tri$((C_1-C_4)$alkyl)aluminum and a halogenated tri$((C_6-C_{18})$aryl)boron compound, especially a tris(pentafluorophenyl)borane. Other exemplary embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Exemplary embodiments ratios of numbers of moles of (metal-ligand complex): (tris(pentafluoro-phenylborane):(alumoxane) [e.g., (Group 4 metal-ligand complex):(tris(pentafluoro-phenylborane): (alumoxane)] are from 1:1:1 to 1:10:30, other exemplary embodiments are from 1:1:1.5 to 1:5:10.

Many activating co-catalysts and activating techniques have been previously taught with respect to different metal-ligand complexes in the following U.S. Pat. Nos. 5,064,802; 5,153,157; 5,296,433; 5,321,106; 5,350,723; 5,425,872; 5,625,087; 5,721,185; 5,783,512; 5,883,204; 5,919,983; 6,696,379; and U.S. Pat. No. 7,163,907. Examples of suitable hydrocarbyloxides are disclosed in U.S. Pat. No. 5,296, 433. Examples of suitable Bronsted acid salts for addition polymerization catalysts are disclosed in U.S. Pat. Nos. 5,064,802; 5,919,983; 5,783,512. Examples of suitable salts of a cationic oxidizing agent and a non-coordinating, compatible anion as activating co-catalysts for addition polymerization catalysts are disclosed in U.S. Pat. No. 5,321,106. Examples of suitable carbenium salts as activating co-catalysts for addition polymerization catalysts are disclosed in U.S. Pat. No. 5,350,723. Examples of suitable silylium salts as activating co-catalysts for addition polymerization catalysts are disclosed in U.S. Pat. No. 5,625,087. Examples of suitable complexes of alcohols, mercaptans, silanols, and oximes with tris(pentafluorophenyl)borane are disclosed in U.S. Pat. No. 5,296,433. Some of these catalysts are also described in a portion of U.S. Pat. No. 6,515,155 B1 beginning at column 50, at line 39, and going through column 56, at line 55, only the portion of which is incorporated by reference herein.

In some embodiments, the procatalyst comprising the metal-ligand complex of formula (I) may be activated to form an active catalyst composition by combination with one or more cocatalyst such as a cation forming cocatalyst, a strong Lewis acid, or a combination thereof. Suitable cocatalysts for use include polymeric or oligomeric aluminoxanes, especially methyl aluminoxane, as well as inert, compatible, noncoordinating, ion forming compounds. Exemplary suitable cocatalysts include, but are not limited to modified methyl aluminoxane (MMAO), bis(hydrogenated tallow alkyl)methyl, tetrakis(pentafluorophenyl)borate(1-) amine, triethyl aluminum (TEA), and any combinations thereof.

In some embodiments, one or more of the foregoing activating co-catalysts are used in combination with each other. An especially preferred combination is a mixture of a tri$((C_1-C_4)$hydrocarbyl)aluminum, tri$((C_1-C_4)$hydrocarbyl) borane, or an ammonium borate with an oligomeric or polymeric alumoxane compound.

The ratio of total number of moles of one or more metal-ligand complexes of formula (I) to total number of moles of one or more of the activating co-catalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the activating co-catalyst, preferably the number of moles of the alumoxane that are employed is at least 100 times the number of moles of the metal-ligand complex of formula (I). When tris (pentafluorophenyl)borane alone is used as the activating co-catalyst, in some other embodiments, the number of moles of the tris(pentafluorophenyl)borane that are employed to the total number of moles of one or more metal-ligand complexes of formula (I) form 0.5:1 to 10:1, in some other embodiments, from 1:1 to 6:1, in some other embodiments, from 1:1 to 5:1. The remaining activating co-catalysts are generally employed in approximately mole quantities equal to the total mole quantities of one or more metal-ligand complexes of formula (I).

End-Use Applications

The LLDPEs according to the present disclosure are suitable for cast film extrusion process or blown film extrusion process, where in the films are at least further oriented in the machine direction. The LLDPEs according to the present disclosure may be extruded in neat form or in blends with other polymers, additives and fillers. The films may be monolayer or coextruded multi-layer films obtained by various extrusion through a single or multiple dies. The resultant films may be the used as-is or may be laminated to other films or substrates, for example by thermal, adhesive lamination or direct extrusion onto a substrate. The resultant films and laminates may be subjected to other forming operations such as embossing, stretching, thermoforming. Surface treatments such as corona may be applied and the films may be printed.

The films made with LLDPEs according to the present disclosure exhibit steep tensile machine direction (MD) curve, which in turn leads to excellent stretchability during machine direction orientation (MDO) activation. The films made with LLDPEs according to the present disclosure can have a stretch ratios of at least 1.5× during machine direction orientation, for example, from 2× to 6×, or in the alternative from 2× to 5.5×, or in the alternative from 2× to 5', or in the alternative, from 2× to 4.5×.

The breathable films according to the present invention have a basis weight in the range of from 5 to 25 gsm. All individual values and subranges from 5 to 25 gsm are included and disclosed herein; for example, the basis weight of the film may range from a lower limit of 5, 8, 11, 14, 17, 20 or 23 gsm to an upper limit of 6, 9, 12, 15, 18, 21, or 25 gsm. For example, the basis weight of the film can range from 5 to 25 gsm, or in the alternative, from 5 to 15, or in the alternative, from 15 to 25 gsm, or in the alternative, from 10 to 20 gsm, or in the alternative, from 10 to 23 gsm.

The breathable films according to the present invention have a water vapor transmission rate in the range of from 1,000 to 9.000 g per square meter per day (g/m$^2$-day), measure at 38° C. All individual values and subranges from 1,000 to 9,000 g/m$^2$-day are included and disclosed herein; for example the water vapor transmission rate may range from a lower limit of 1,000, 3,000, or 5,000 g/m$^2$-day to an upper limit of 2,000, 5,000, 8,000 or 9,000 g/m$^2$-day. For example, the water vapor transmission rate can range from 1,000 to 9,000 g/m$^2$-day, or in the alternative, from 1,000 to 5,000 g/m²-day, or in the alternative, from 5,000 to 9,000 g/m²-day, or in the alternative, from 3,000 to 7,000 g/m²-day.

The films and laminates made from inventive compositions may be used in a variety of purposes, for example food packaging. The films are also suitable in hygiene and medical applications, for example in breathable films used in diapers, adult incontinence products, feminine hygiene products, bed liners, animal training products and animal incontinence products.

EXAMPLES

The following examples illustrate the present invention but are not intended to limit the scope of the invention. The examples of the instant invention demonstrate that selection of LLDPE of the present disclosure leads to superior performance during machine direction orientation, i.e. very low "minimum stretch ratio," while maintaining acceptable final film properties such as water vapor transmission rate (WVTR), shrinkage and puncture strength even at low stretch ratios.

Comparative composition 1 is DOWLEX 2107G is a heterogeneously branched ethylene-octene copolymer having a melt index ($I_2$) of approximately 2.3 g/10 minutes, a CEF fraction from 70 to 90° C. of 48.6%, an $I_{10}/I_2$ of 8.5 and a density of 0.917 g/cm³, available from The Dow Chemical Company.

Comparative composition 2 is EXCEED 3518 is an ethylene-hexene copolymer prepared via gas phase polymerization process in the presence of a metallocene catalyst system having a melt index ($I_2$) of 3.5 g/10 minutes, a CEF fraction from 70 to 90° C. of 74.5%, an $I_{10}/I_2$ of 5.8, and a density of 0.918 g/cm³, available from ExxonMobil Chemical Company.

Inventive composition 1 is an ethylene-hexene copolymer having a melt index ($I_2$) of 3.2 g/10 minutes, a CEF fraction from 70 to 90° C. of 91.9%, an $I_{10}/I_2$ of 6.5, and a density of 0.918 g/cm³. Inventive composition 1 is prepared via solution polymerization in a single loop reactor system as described in U.S. Pat. No. 5,977,251 in the presence of a catalyst system comprising a procatalyst represented by the following formula:

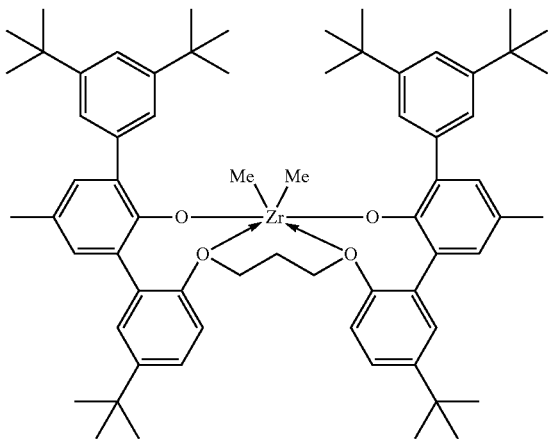

The polymerization conditions for Inventive composition 1 are reported in Tables 1 and 2. Referring to Tables 1 and 2, TEA is triethylaluminum and PETROSOL D 100/120 is solvent which is commercially available from CEPSA (Compania Espanola de Petroleos, S.A.U., Madrid, Spain). Properties of Inventive Composition 1 and Comparative Compositions 1 and 2 are measured and reported in Tables 3-6.

TABLE 1

|  | Units | Inventive Composition 1 |
|---|---|---|
| 1. REACTOR FEEDS | | |
| Reactor Solvent/Ethylene Feed Flow ratio | g/g | 4.05 |
| Solvent Type Used | | PETROSOL D 100/120 |
| Comonomer Type Used | | 1-Hexene |
| Reactor Comonomer/Ethylene Feed Flow ratio | g/g | 0.257 |
| Reactor Fresh Hydrogen/ethylene Feed Flow ratio | g/kg | 0.111 |
| Reactor Control Temperature | ° C. | 155 |
| Reactor Pressure (gauge) | bar | 51.7 |
| Reactor Ethylene Conversion | % | 86.5 |
| Reactor Residence Time | Min | 6.7 |
| Recycle Ratio | | 4.3 |

TABLE 2

| 3. CATALYST | Inventive Composition 1 |
|---|---|
| Reactor Co-Catalyst-1/Catalyst Molar feed Ratio | 3.0 |
| Reactor Co-Catalyst-1 Type | bis(hydrogenated tallow alkyl)methyl, tetrakis(pentafluorophenyl)borate(1-)amine |
| Reactor Co-Catalyst-2/Catalyst Molar Ratio | 33 |
| Reactor Co-Catalyst-2 Type | TEA |

TABLE 3

|  | Unsaturation unit/1,000,000 carbon | | | | |
|---|---|---|---|---|---|
|  | vinylene | Trisubstituted | vinyl | vinylidene | Total |
| Inventive Composition 1 | 3 | Not Determined (ND) | 35 | 2 | 40 |
| Comparative Composition 2 | 14 | 41 | 51 | 20 | 126 |
| Comparative Composition 1 | 45 | 18 | 305 | 67 | 435 |

TABLE 4

|  | $M_w$ (g/mol) | ZSV (Pas) | ZSVR |
|---|---|---|---|
| Inventive Composition 1 | 75000 | 2820 | 1.98 |
| Comparative Composition 2 | 77100 | 2050 | 1.30 |
| Comparative Composition 1 | 87100 | 4190 | 1.70 |

TABLE 5

|  | $M_n$ (g/mol) | $M_w$ (g/mol) | $M_z$ (g/mol) | $M_w/M_n$ | $M_z/M_w$ |
|---|---|---|---|---|---|
| Inventive Composition 1 | 34300 | 75000 | 136000 | 2.19 | 1.81 |
| Comparative Composition 2 | 31000 | 77100 | 137000 | 2.49 | 1.77 |
| Comparative Composition 1 | 21600 | 87100 | 327000 | 4.03 | 3.75 |

TABLE 6

|  | Heat of crystallization (g/mol) | Peak crystallization temperature (° C.) | Heat of melting (g/mol) | Peak melting temperature (° C.) |
| --- | --- | --- | --- | --- |
| Inventive Composition 1 | 139.7 | 97.1 | 139.7 | 112.3 |
| Comparative Composition 2 | 145.6 | 101.1 | 145.1 | 113.8 |
| Comparative Composition 1 | 140.7 | 107.1 | 140.3 | 123.3 |

Inventive Composition 1 and Comparative Compositions 1 and 2 were extruded on Collin Cast line in accordance with the process conditions shown in Table 7 to form monolayer films. The films are referred to herein by the composition from which it is formed.

TABLE 7

Die gap (mm): 0.8
Line Speed (m/min): 7.5
Melt Temperature (° C.): 215
Output Rate (Kg/h): 5
Thickness (μm): 50

Figure 2:
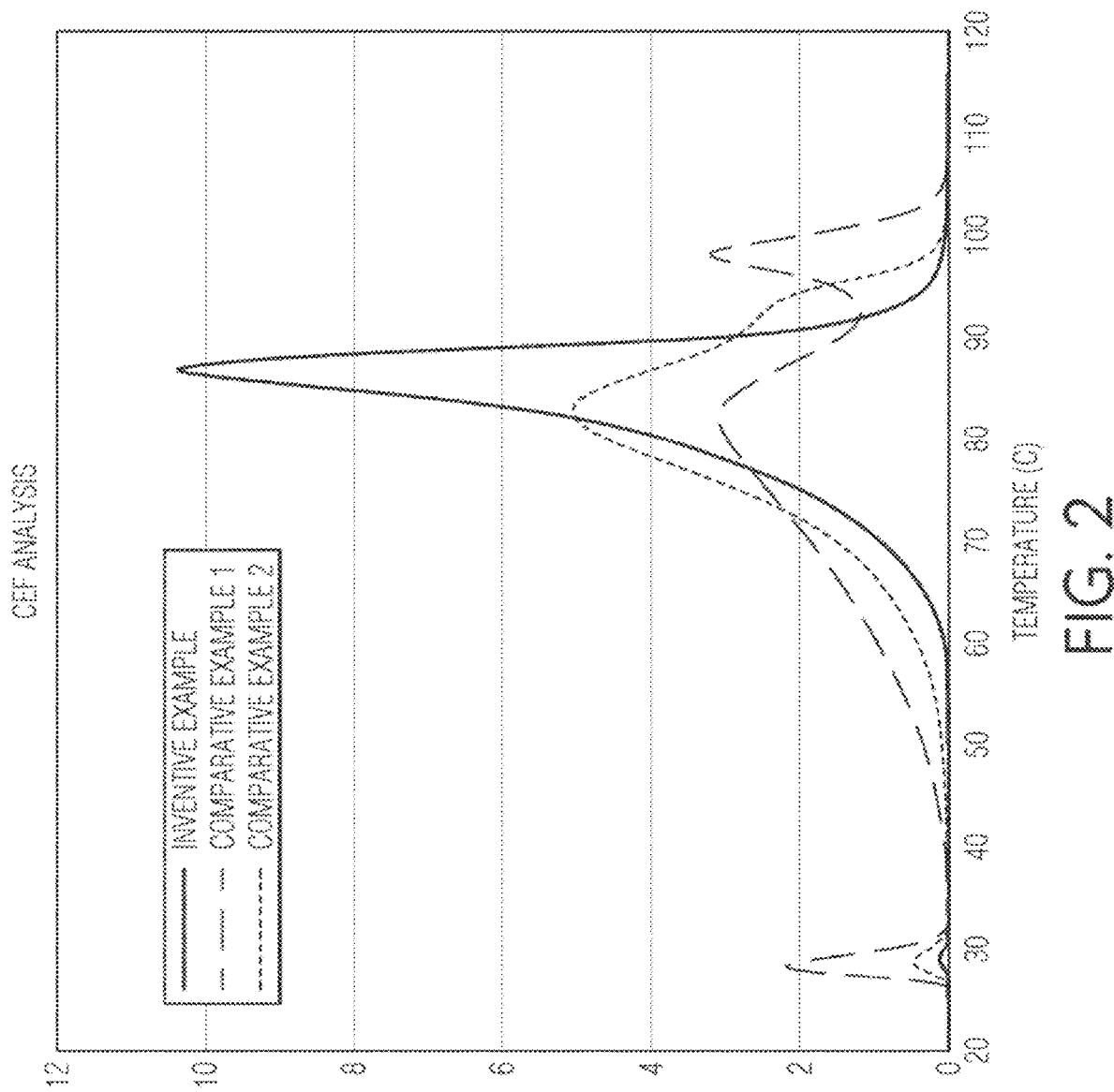
FIG. 2 is a graph illustrating CEF analysis of the inventive and comparative compositions.

Properties of the films based on Inventive Composition 1 and Comparative Compositions 1 and 2 are measured and reported in FIGS. 1 and 2. Referring to FIG. 1, the tensile curves clearly indicate that the film made from Inventive Composition 1 reaches sooner the area of strain hardening than the films made from Comparative Compositions 1 and 2. The ratio of tensile force at 200 mm elongation to the tensile force at 75 mm elongation is defined herein as the hardening ratio. The hardening ratios of the film made from Inventive Composition 1 and the films made from Comparative Compositions 1 and 2 are given in Table 8.

TABLE 8

Hardening Ratio

Comparative Composition 1 = 1.08
Comparative Composition 2 = 1.08
Inventive Composition 1 = 1.22

Inventive Composition 1 and Comparative Compositions 1 and 2 were further compounded to include 50% by weight of $CaCO_3$ via a Buss compounder. Each of the resulting compounds, Inventive compounded composition 1, Comparative compounded composition 1 and Comparative compounded composition 2 respectively, were dried for six hours at 60° C. and then packed in aluminum bags to avoid moisture pick-up before extrusion.

Inventive compounded composition 1, Comparative compounded composition 1 and Comparative compounded composition 2 were extruded via Collin Cast Extrusion line equipped with a machine direction orientation (MDO) stretching unit with a target basis weight of 18 GSM. The compounds were fed into a hopper and extruded through a cast die into thin films. The films were then stretched in an MDO unit by means of heated rolls running at different velocities. The set-up allowed for stretching and subsequent annealing of the film.

Stretching is calculated as the ratio between the final (winder) velocity and the velocity at the intake roll of the MDO unit.

The process settings during extrusion and stretching were as shown in Table 9 below:

TABLE 9

Melt temperature: 225° C. (feeding zone 45° C., first zone 190° C., second zone 210° C. all other zones: 230° C.)
Die gap: 0.75 mm
42 micron filter
Extruder RPM 35
Chill roll at 45° C.
Stretching at 60° C., intake and annealing rolls at 40° C.

For Comparative compounded composition 1, the stretch ratio was increased until tiger stripes disappeared and the film had a visual homogeneous appearance. The stretch ratio at which tiger stripes disappeared is called "Comparative compounded composition 1 minimum stretch ratio". At this stretch ratio, the target basis weight of 18 GSM was obtained by adjusting the velocity at the intake roll of the MDO unit, and a film sample was taken.

Then the Comparative compounded composition 2 was run. The "Comparative compounded composition 2 minimum stretch ratio" was similar to the "Comparative compounded composition 1 minimum stretch ratio". A film sample was taken.

Inventive compounded composition lwas run next. The "Inventive compounded composition 1 minimum stretch ratio" was significantly lower than the "Comparative compounded composition 2 minimum stretch ratio". A film sample was taken.

Then the stretch ratio was increased until the value of the "Comparative compounded composition 2 minimum stretch ratio" was reached, and a second film sample taken.

The stretch ratios are reported in the Table 10.

TABLE 10

| Formulation | Stretch ratio (SR) of collected film samples | Min stretch ratio to avoid tiger stripes |
| --- | --- | --- |
| Comparative compounded composition 1 | 5.0 | 5.0 |
| Comparative compounded composition 2 | 5.2 | 5.2 |
| Inventive compounded composition 1 | 2.8 5.2 | 2.8 |

The properties of the four film samples as shown in Table 4 obtained above were measured are shown in FIGS. 3-6:

Tensile Elongation at Break CD for each of the four film samples as shown in Table 4 was measured and the results are given in Table 11.

TABLE 11

|  | Tensile Elongation at Break CD |
| --- | --- |
| Comparative compounded composition 1/SR 5 | 503% |
| Comparative compounded composition 2/SR 5.2 | 496% |
| Inventive compounded composition 1/SR 5.2 | 481% |
| Inventive compounded composition 1/SR 2.8 | 499% |

Figure 3:
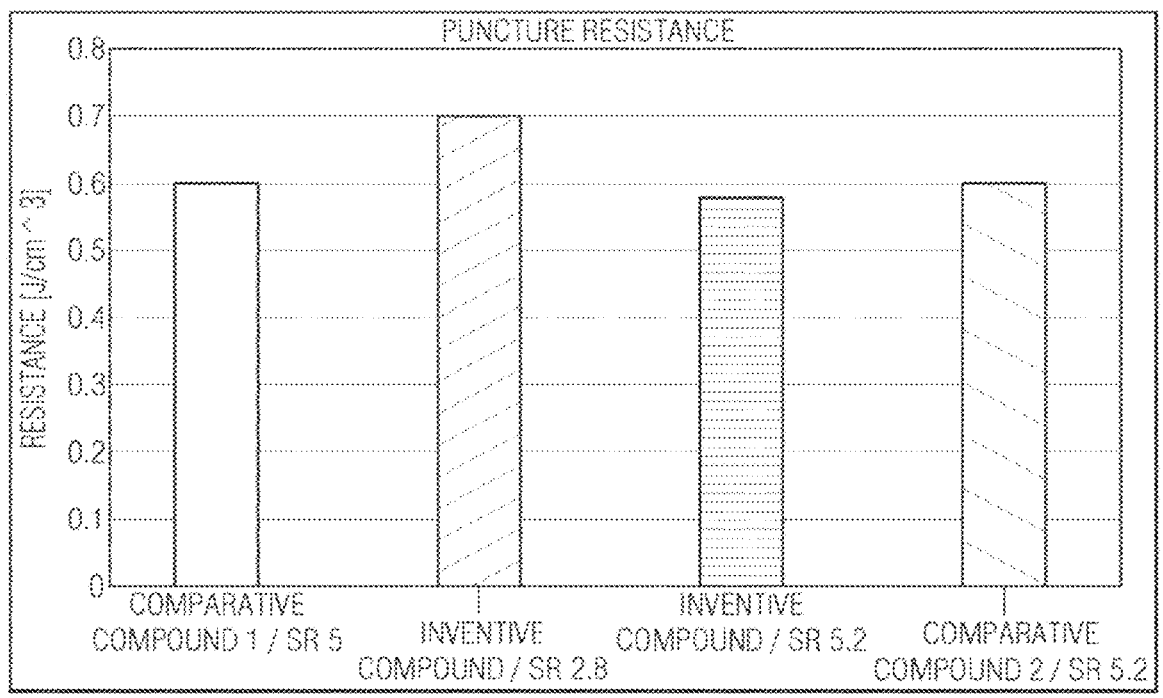
FIG. 3 is a graph illustrating puncture resistance of films formed from the inventive and comparative compounded compositions.

Referring to FIG. 3, the difference between the values corresponds to the property window that can be obtained with the Inventive compounded composition 1 in the stretch range of 2.8× to 5.2×. At the same stretch ratio, Inventive compounded composition 1 and Comparative compounded compositions 1 and 2 fall within the same range of puncture resistance.

Figure 4:
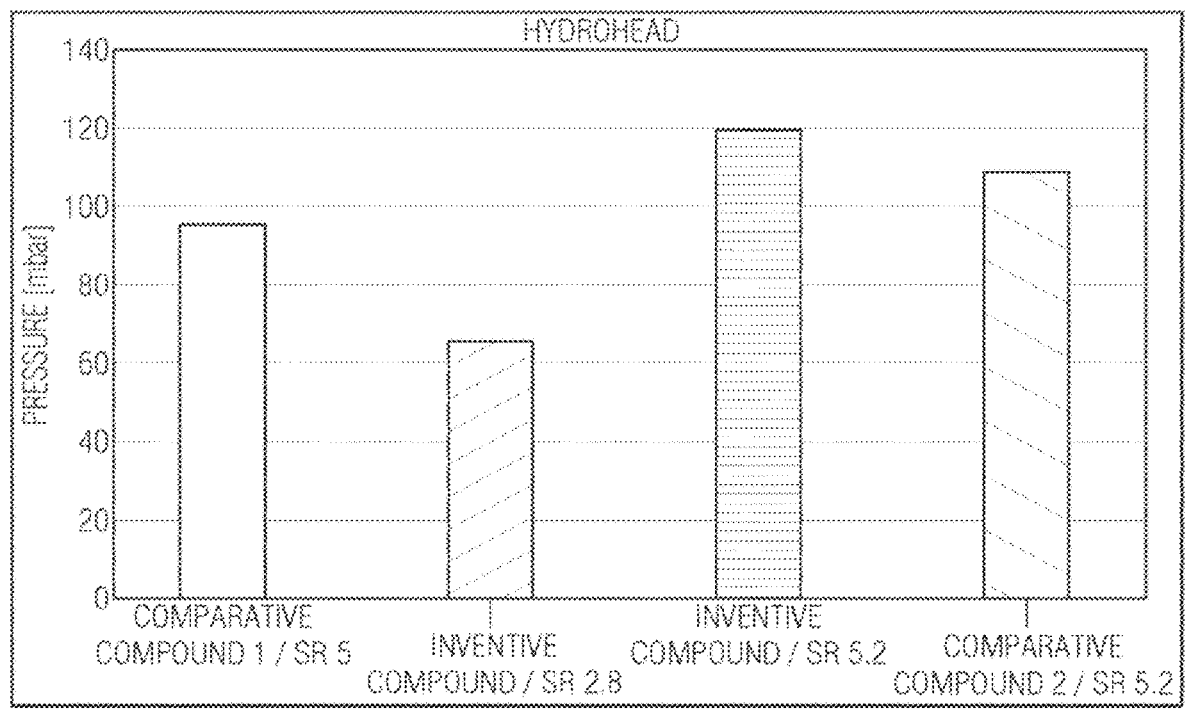
FIG. 4 is a graph illustrating hydrohead of films formed from the inventive and comparative compounded compositions.

Referring to FIG. 4, a broad range of Hydrohead values can be obtained with inventive compound. Comparing Inventive compounded composition 1 and Comparative compounded compositions 1 and 2 at same stretch ratios shows the superiority of Inventive compounded composition 1.

Figure 5:
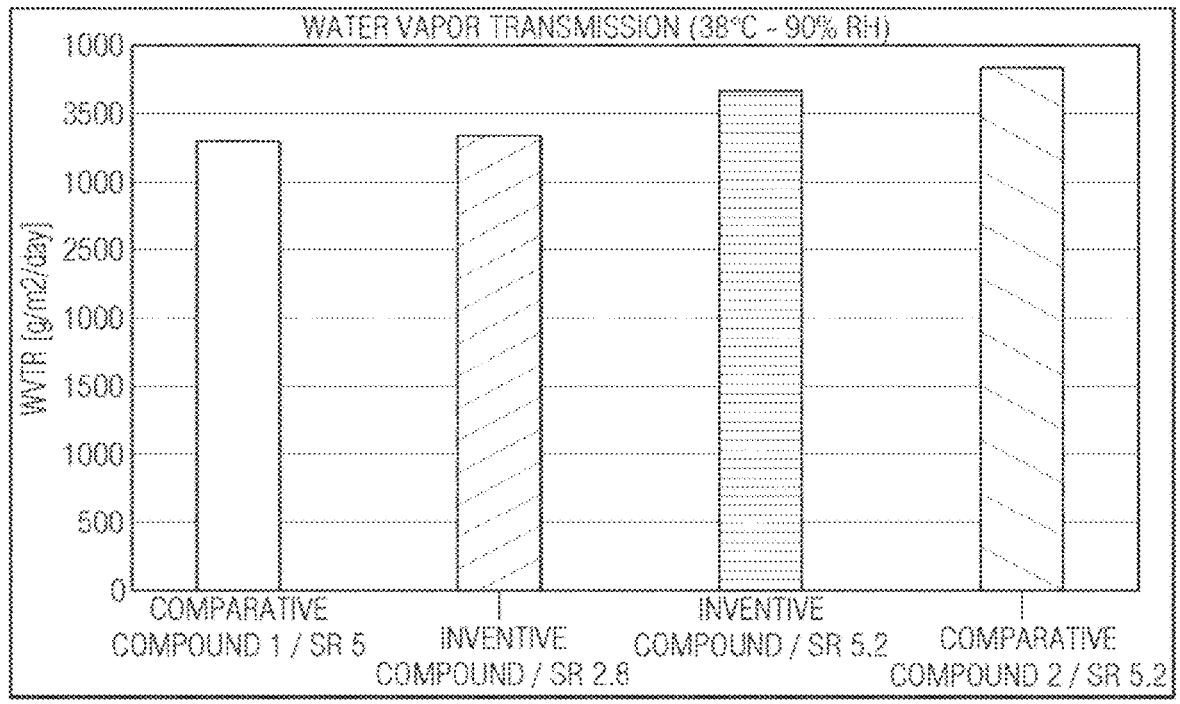
FIG. 5 is a graph illustrating water vapor transmission (38° C. 90% RH) properties of films formed from the inventive and comparative compounded compositions.

Referring to FIG. 5, within the tested stretch ratios, the window of WVTR for the Inventive compounded composition 1 is relatively narrow, i.e. acceptable WVTR values can be obtained also at low stretch ratios. At same stretch ratio Inventive compounded composition 1 has slightly higher WVTR than Comparative compounded composition 1 and is in the same range as comparative compounded composition 2 (difference <5%).

Figure 6:
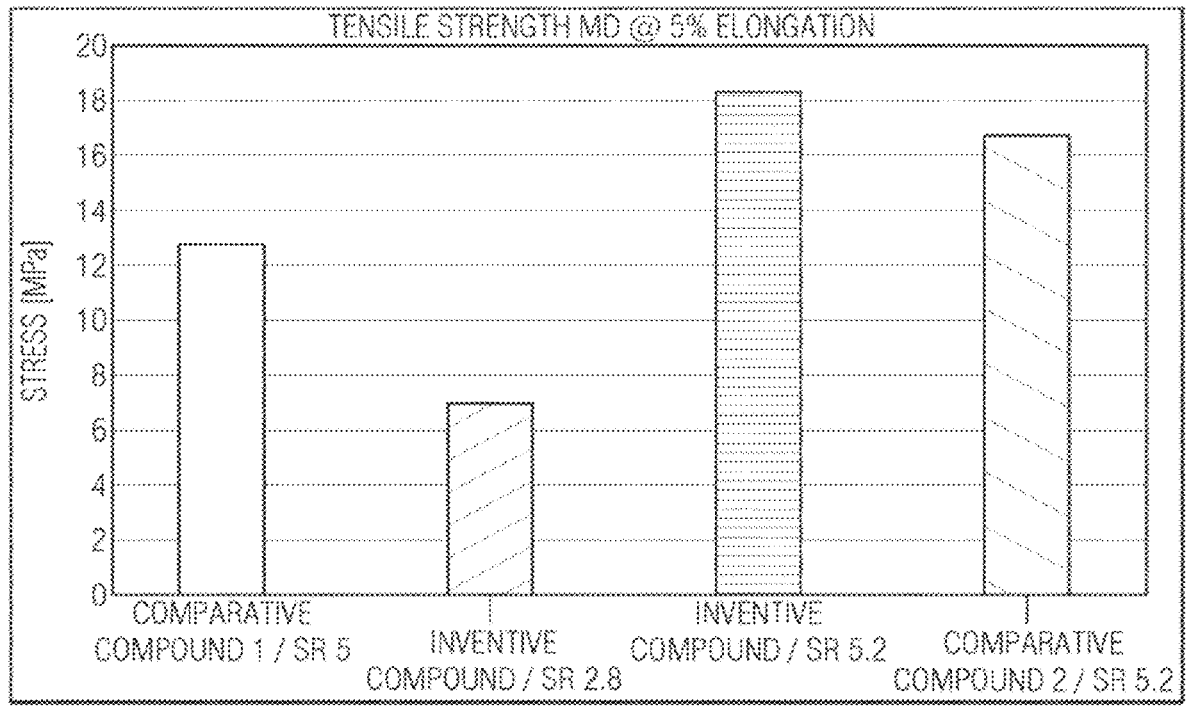
FIG. 6 is a graph illustrating tensile strength properties of films formed from the inventive and comparative compounded compositions in machine direction at 5% elongation.

Referring to FIG. 6, comparison between formulations stretched at the same level shows a better performance of Inventive compounded composition 1 over the Comparative compounded compositions 1 and 2.

Figure 7:
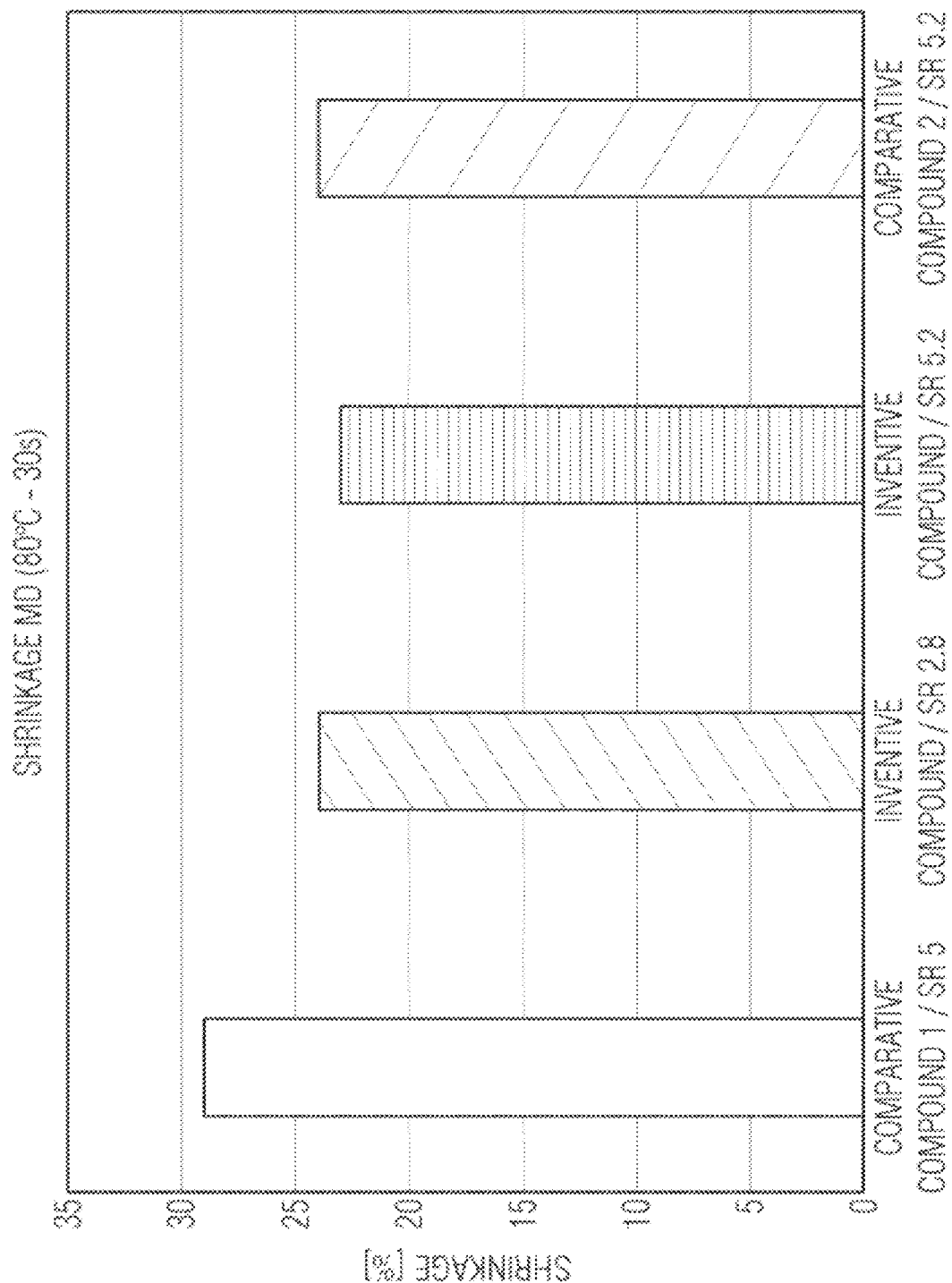
FIG. 7 is a graph illustrating shrinkage properties of inventive and comparative examples in machine direction (submerged in water bath at 80° C. for 30 Seconds)

Referring to FIG. 7, surprisingly, the shrinkage of Inventive compounded composition 1 appears to be independent from the stretch ratio. At the same stretch ratio, the shrinkage of Inventive compounded composition 1 is better than the shrinkage from the Comparative compounded composition 1 and relatively close to Comparative compounded composition 2.

Test Methods

Test methods include the following:
Melt Index

Melt indices ($I_2$ and $I_{10}$) were measured in accordance to ASTM D-1238 at 190° C. and at 2.16 kg and 10 kg load, respectively. Their values are reported in g/10 min.
Density Samples for density measurement were prepared according to ASTM D4703. Measurements were made within one hour of sample pressing using ASTM D792, Method B.
High Temperature Gel Permeation Chromatography The Gel Permeation Chromatography (GPC) system consists of a Waters (Milford, Mass.) 150 C high temperature chromatograph (other suitable high temperatures GPC instruments include Polymer Laboratories (Shropshire, UK) Model 210 and Model 220) equipped with an on-board differential refractometer (RI) (other suitable concentration detectors can include an IR4 infra-red detector from Polymer ChAR (Valencia, Spain)). Data collection is performed using Viscotek TriSEC software, Version 3, and a 4-channel Viscotek Data Manager DM400. The system is also equipped with an on-line solvent degassing device from Polymer Laboratories (Shropshire, United Kingdom).

Suitable high temperature GPC columns can be used such as four 30 cm long Shodex HT803 13 micron columns or four 30 cm Polymer Labs columns of 20-micron mixed-pore-size packing (MixA LS, Polymer Labs). The sample carousel compartment is operated at 140° C. and the column compartment is operated at 150° C. The samples are prepared at a concentration of 0.1 grams of polymer in 50 milliliters of solvent. The chromatographic solvent and the sample preparation solvent contain 200 ppm of trichlorobenzene (TCB). Both solvents are sparged with nitrogen. The polyethylene samples are gently stirred at 160° C. for four hours. The injection volume is 200 microliters. The flow rate through the GPC is set at 1 ml/minute.

The GPC column set is calibrated by running 21 narrow molecular weight distribution polystyrene standards. The molecular weight (MW) of the standards ranges from 580 to 8,400,000, and the standards are contained in 6 "cocktail" mixtures. Each standard mixture has at least a decade of separation between individual molecular weights. The standard mixtures are purchased from Polymer Laboratories. The polystyrene standards are prepared at 0.025 g in 50 mL of solvent for molecular weights equal to or greater than 1,000,000 and 0.05 g in 50 mL of solvent for molecular weights less than 1,000,000. The polystyrene standards were dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weight using the following Equation (as described in Williams and Ward, J. Polym. Sci., Polym. Letters, 6, 621 (1968)):

$$M_{polyethlene} = A \times (M_{polystyrene})^B,$$

where M is the molecular weight of polyethylene or polystyrene (as marked), and B is equal to 1.0. It is known to those of ordinary skill in the art that A may be in a range of about 0.38 to about 0.44 and is determined at the time of calibration using a broad polyethylene standard. Use of this polyethylene calibration method to obtain molecular weight values, such as the molecular weight distribution (MWD or $M_w/M_n$), and related statistics (generally refers to conventional GPC or cc-GPC results), is defined here as the modified method of Williams and Ward.

DSC Crystallinity

Differential Scanning calorimetry (DSC) can be used to measure the melting and crystallization behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at about 175. degree. C.; the melted sample is then air-cooled to room temperature (about 25° C.). A 3-10 mg, 6 mm diameter specimen is extracted from the cooled polymer, weighed, placed in a light aluminum pan (about 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to −40° C. at a 10° C./minute cooling rate and held isothermal at −40° C. for 3 minutes. The sample is then heated to 150° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are peak melting temperature ($T_m$), peak recrystallization temperature ($T_p$), heat of fusion ($H_f$) (in Joules per gram), and the calculated % crystallinity for polyethylene samples using the following equation:

% Crystallinity=(($H_f$)/(292 J/g))×100.

The heat of fusion ($H_f$) and the peak melting temperature are reported from the second heat curve. Peak recrystallization temperature is determined from the cooling curve as $T_p$.

Crystallization Elution Fractionation (CEF) Method

The Crystallization Elution Fractionation (CEF) method is conducted according to the method described in Monrabal et al, Macromol. Symp. 257, 71-79 (2007), which is incorporated herein by reference. The CEF instrument is equipped with an IR-4 detector (such as that sold commercially from PolymerChar, Spain) and a two angle light scattering detector Model 2040 (such as those sold commercially from Precision Detectors). The IR-4 detector operates in the compositional mode with two filters: C006 and B057. A 10 micron guard column of 50 mm×4.6 mm (such as that sold commercially from PolymerLabs) is installed before the IR-4 detector in the detector oven. Ortho-dichlorobenzene (ODCB, 99% anhydrous grade) and 2,5-di-tert-butyl-4-methylphenol (BHT) (such as commercially available from Sigma-Aldrich) are obtained. Silica gel 40 (particle size 0.2~0.5 mm) (such as commercially available from EMD Chemicals) is also obtained. The silica gel is dried in a vacuum oven at 160° C. for about two hours before use. Eight hundred milligrams of BHT and five grams of silica gel are added to two liters of ODCB. ODCB containing BHT and silica gel is hereinafter referred to as "ODCB-m." ODCB-m is sparged with dried nitrogen ($N_2$) for one hour before use. Dried nitrogen is obtained by passing nitrogen at <90 psig over $CaCO_3$ and 5 Å molecular sieves. A sample solution is prepared by, using the autosampler, dissolving a polymer sample in ODCB-m at 4 mg/ml under shaking at 160° C. for 2 hours. 300 μL of the sample solution is injected into the column. The temperature profile of CEF is: crystallization at 3° C./min from 110° C. to 25° C., thermal equilibrium at 30° C. for 5 minutes (including Soluble Fraction Elution Time being set as 2 minutes), and elution at 3° C./min from 25° C. to 140° C. The flow rate during crystallization is 0.052 mL/min. The flow rate during elution is 0.50 mL/min. The IR-4 signal data is collected at one data point/second.

The CEF column is packed with glass beads at 125 μm±6% (such as those commercially available from MO-SCI Specialty Products) with ⅛ inch stainless tubing according to U.S. 2011/0015346 A1. The internal liquid volume of the CEF column is between 2.1 mL and 2.3 mL. Temperature calibration is performed by using a mixture of NIST Standard Reference Material linear polyethylene 1475a (1.0 mg/ml) and Eicosane (2 mg/ml) in ODCB-m. The calibration consists of four steps: (1) calculating the delay volume defined as the temperature offset between the measured peak elution temperature of Eicosane minus 30.00° C.; (2) subtracting the temperature offset of the elution temperature from the CEF raw temperature data. It is noted that this temperature offset is a function of experimental conditions, such as elution temperature, elution flow rate, etc.; (3) creating a linear calibration line transforming the elution temperature across a range of 25.00° C. and 140.00° C. such that NIST linear polyethylene 1475a has a peak temperature at 101.00° C., and Eicosane has a peak temperature of 30.00° C., (4) for the soluble fraction measured isothermally at 30° C., the elution temperature is extrapolated linearly by using the elution heating rate of 3° C./min. The reported elution peak temperatures are obtained such that the observed comonomer content calibration curve agrees with those previously reported in U.S. Pat. No. 8,372,931.

The CEF fraction from 70 to 90° C., is defined as the integral of the IR-4 chromatogram (baseline subtracted measurement channel) in the elution temperature ranging from 70.0 to 90.0° C. divided by the total integral from 25 to 140.0° C. according to the follow equation:

$$CEF \text{ fraction from 70 to 90° } C. = \frac{\int_{70}^{90} IRdT}{\int_{25}^{140} IRdT} \times 100\%$$

where T is the elution temperature (from the calibration discussed above).

A linear baseline is calculated by selecting two data points: one before the polymer elutes, usually at a temperature of 25.5° C., and another one after the polymer elutes, usually at 118° C. For each data point, the detector signal is subtracted from the baseline before integration.

Creep Zero Shear Viscosity Measurement Method

Zero-shear viscosities are obtained via creep tests that were conducted on an AR-G2 stress controlled rheometer (TA Instruments; New Castle, Del.) using 25-mm-diameter parallel plates at 190° C. The rheometer oven is set to test temperature for at least 30 minutes prior to zeroing fixtures. At the testing temperature a compression molded sample disk is inserted between the plates and allowed to come to equilibrium for 5 minutes. The upper plate is then lowered down to 50 above the desired testing gap (1.5 mm). Any superfluous material is trimmed off and the upper plate is lowered to the desired gap. Measurements are done under nitrogen purging at a flow rate of 5 L/min. Default creep time is set for 2 hours.

A constant low shear stress of 20 Pa is applied for all of the samples to ensure that the steady state shear rate is low enough to be in the Newtonian region. The resulting steady state shear rates are in the range of $10^{-3}$ to $10^{-4}$ $s^{-1}$ for the samples in this study. Steady state is determined by taking a linear regression for all the data in the last 10% time window of the plot of log (J(t)) vs. log(t), where J(t) is creep compliance and t is creep time. If the slope of the linear regression is greater than 0.97, steady state is considered to be reached, then the creep test is stopped. In all cases in this study the slope meets the criterion within 2 hours. The steady state shear rate is determined from the slope of the linear regression of all of the data points in the last 10% time window of the plot of ε vs. t, where ε is strain. The zero-shear viscosity is determined from the ratio of the applied stress to the steady state shear rate.

In order to determine if the sample is degraded during the creep test, a small amplitude oscillatory shear test is conducted before and after the creep test on the same specimen from 0.1 to 100 rad/s. The complex viscosity values of the two tests are compared. If the difference of the viscosity values at 0.1 rad/s is greater than 5%, the sample is considered to have degraded during the creep test, and the result is discarded.

Zero-Shear Viscosity Ratio (ZSVR) is defined as the ratio of the zero-shear viscosity (ZSV) of the branched polyethylene material to the ZSV of the linear polyethylene material at the equivalent weight average molecular weight (Mw-gpc) according to the following Equation:

$$ZSVR = \frac{\eta_{0B}}{\eta_{0L}} = \frac{\eta_{0B}}{2.29^{-15}M_{w-gpc}^{3.65}}$$

The ZSV value is obtained from creep test at 190° C. via the method described above. The Mw-gpc value is determined by the conventional GPC method. The correlation between ZSV of linear polyethylene and its Mw-gpc was established based on a series of linear polyethylene reference materials. A description for the ZSV-Mw relationship can be found in the ANTEC proceeding: Karjala, Teresa P.; Sammler, Robert L.; Mangnus, Marc A.; Hazlitt, Lonnie G.; Johnson, Mark S.; Hagen, Charles M., Jr.; Huang, Joe W. L.; Reichek, Kenneth N. Detection of low levels of long-chain branching in polyolefins. Annual Technical Conference—Society of Plastics Engineers (2008), 66th 887-891.

$^1$H NMR Method 3.26 g of stock solution is added to 0.133 g of polyolefin sample in 10 mm NMR tube. The stock solution is a mixture of tetrachloroethane-d2 (TCE) and perchloroethylene (50:50, w:w) with 0.001M Cr'. The solution in the tube is purged with $N_2$ for 5 minutes to reduce the amount of oxygen. The capped sample tube is left at room temperature overnight to swell the polymer sample. The sample is dissolved at 110° C. with shaking. The samples are free of the additives that may contribute to unsaturation, e.g. slip agents such as erucamide.

The $^1$H NMR are run with a 10 mm cryoprobe at 120° C. on Bruker AVANCE 400 MHz spectrometer.

Two experiments are run to get the unsaturation: the control and the double pre-saturation experiments.

For the control experiment, the data is processed with exponential window function with LB=1 Hz, baseline was corrected from 7 to −2 ppm. The signal from residual $^1$H of TCE is set to 100, the integral $I_{total}$ from −0.5 to 3 ppm is used as the signal from whole polymer in the control experiment. The number of $CH_2$ group, $NCH_2$, in the polymer is calculated as following:

$NCH_2 = I_{total}/2$

Figure 8:
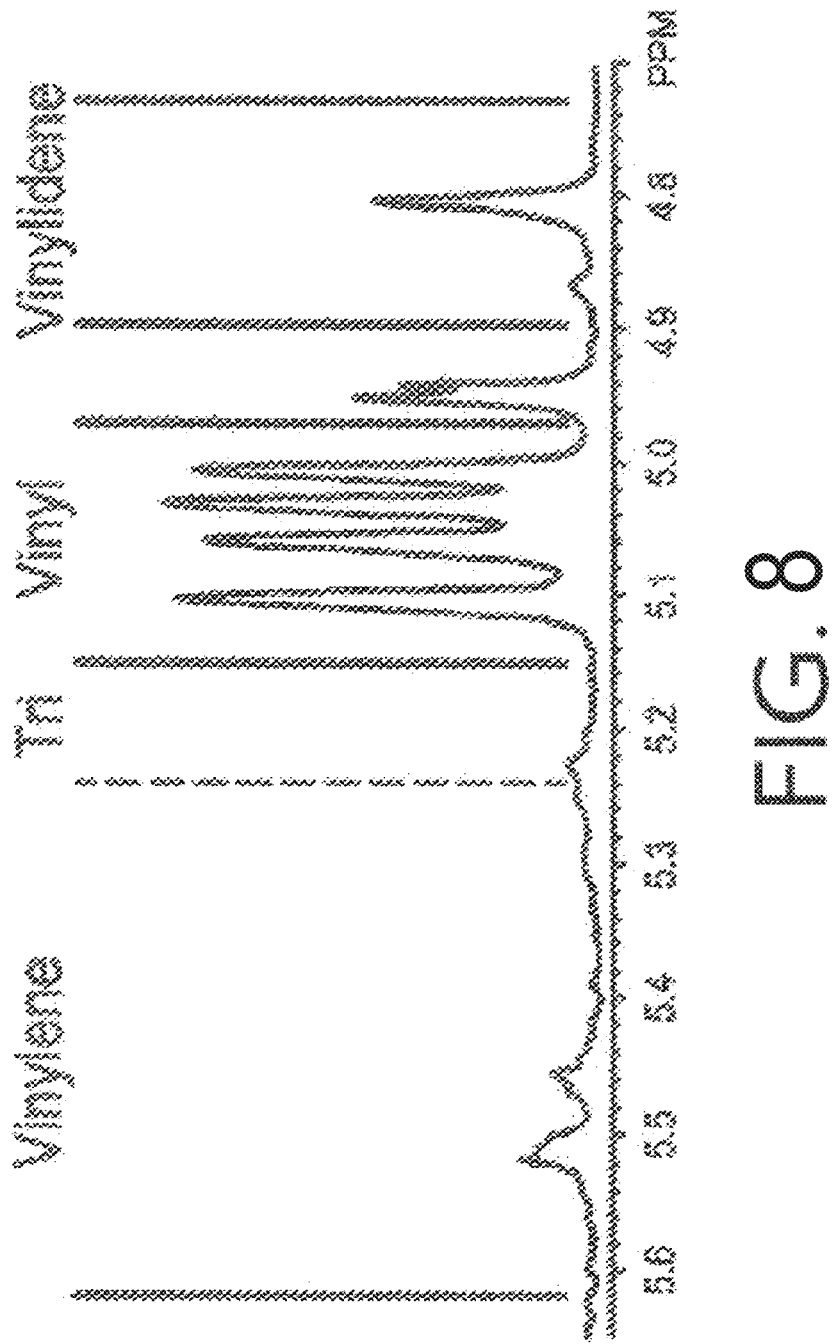
FIG. 8 is a graph illustrating corresponding integrals for unsaturations ($I_{vinylene}$, $I_{trisubstituted}$, $I_{vinyl}$, and $I_{vinylidene}$).

For the double presaturation experiment, the data is processed with exponential window function with LB=1 Hz, baseline was corrected from 6.6 to 4.5 ppm. The signal from residual $^1$H of TCE is set to 100, the corresponding integrals for unsaturations ($I_{vinylene}$, $I_{trisubstituted}$, $I_{vinyl}$ and $I_{vinylidene}$) were integrated based on the region shown in FIG. 8.

The number of unsaturation unit for vinylene, trisubstituted, vinyl and vinylidene are calculated:

$N_{vinylene} = I_{vinylene}/2$ $N_{trisubstituted} = I_{trisubstitute}$ $N_{vinyl} = I_{vinyl}/2$ $N_{vinylidene} = I_{vinylidene}/2$ The unsaturation unit/1,000,000 carbons is calculated as following:

$N_{vinylene}/1,000,000C = (N_{vinylene}/NCH_2)*1,000,000$ $N_{trisubstituted}/1,000,000C = (N_{trisubstituted}/NCH_2)*1,000,000$ $N_{vinylidene}/1,000,000C = (N_{vinylidene}/NCH_2)*1,000,000$ $N_{vinylidene}/1,000,000C = (N_{vinylidene}/NCH_2)*1,000,000$ The requirement for unsaturation NMR analysis includes: level of quantitation is 0.47±0.02/1,000,000 carbons for Vd2 with 200 scans (less than 1 hour data acquisition including time to run the control experiment) with 3.9 wt % of sample (for Vd2 structure, see Macromolecules, vol. 38, 6988, 2005), 10 mm high temperature cryoprobe. The level of quantitation is defined as signal to noise ratio of 10.

The chemical shift reference is set at 6.0 ppm for the $^1$H signal from residual proton from TCT-d2. The control is run with ZG pulse, TD 32768, NS 4, DS 12, SWH 10,000 Hz, AQ 1.64s, D1 14s. The double presaturation experiment is run with a modified pulse sequence, O1P 1.354 ppm, O2P 0.960 ppm, PL9 57 db, PL21 70 db, TD 32768, NS 200, DS 4, SWH 10,000 Hz, AQ 1.64s, D1 1 s, D13 13s. The modified pulse sequences for unsaturation with Bruker AVANCE 400 MHz spectrometer are shown below:

```
;lclprf2_zz
prosol relations=<lcnmr>
#include <Advance, Incl>
"d12=20u"
"d11=tu"
1 ze
d12 pl21:f1
2 30m
d13
d12 pl9:f1
d1 cw:f1 ph29 cw:f2 ph29
d11 do:f1 do:f2
d12 pl1:f1
p1 ph1
go=2 ph31
30m mc #0 to 2 f0(zd)
exit
ph 1=0 2 2 0 1 3 3 1
ph 29=0
ph 31=0 2 2 0 1 3 3 1
```

Film Testing Conditions

The following physical properties are measured on the films produced:
Tensile test: ISO 527-3
Shrinkage ASTM D2732
Puncture: ASTM D-5748
Hydrohead: ISO 1420
Water Vapor Transmission Rate (WVTR): ASTM E398 (measured on Lissy)

The present invention may be embodied in other forms without departing from the spirit and the essential attributes thereof, and, accordingly, reference should be made to the appended claims, rather than to the foregoing specification, as indicating the scope of the invention.

We claim:

1. A film layer comprising:
   a polymeric composition comprising greater than 0 wt. % and less than or equal to 60 wt. % of a linear low density polyethylene which exhibits each of the following properties:
   a CEF fraction from 70° C. to 90° C. of greater than or equal to 80% of the total CEF fractions;
   a melt index ($I_2$) measured according to ASTM D 1238 at 190° C., of greater than or equal to 2.0 g/10 min and less than or equal to 5.0 g/10 min; and
   a melt flow ratio ($I_{10}/I_2$) of less than or equal to 6.7.

2. The film layer of claim 1, wherein the linear low density polyethylene further exhibits a density from 0.915 g/cm$^3$ to 0.94 g/cm$^3$, when measured according to ASTM D792.

3. The film layer of claim 1, wherein the linear low density polyethylene comprises units derived from ethylene and units derived from at least one α-olefin comonomer.

4. The film layer of claim 3, wherein the α-olefin comonomer is 1-hexene.

5. The film layer of claim 1, wherein the linear low density polyethylene comprises no units derived from 1-octene.

6. The film layer of claim 1, wherein the polymeric composition further comprises from greater than 0 wt. % to less than or equal to 5 wt. % one or more compounds selected from the group consisting of pigments and antioxidants.

7. The film layer of claim 1, wherein the polymeric composition further comprises from greater than 0 wt. % to less than or equal to 10 wt. % one or more compounds selected from the group consisting of polypropylene and low density polyethylene.

8. The film layer of claim 1, wherein the polymeric composition further comprises from 40 wt. % to 60 wt. % calcium carbonate ($CaCO_3$).

9. A breathable film comprising at least one film layer according to claim 1.

10. The breathable film of claim 9, wherein the breathable film further comprises filler.

11. The breathable film of claim 9, wherein the at least one film layer comprises a polymeric composition comprising from 30 wt. % to 60 wt. % of the linear low density polyethylene.

12. The breathable film of claim 9, wherein the at least one film layer comprises polymeric composition comprising from 45 wt. % to 55 wt. % of the linear low density polyethylene.

13. An article of manufacture comprising at least one component comprising the breathable film of claim 9, wherein the article of manufacture is selected from the group consisting of diapers, feminine hygiene, adult incontinence products, bed liners, animal training products and animal incontinence products.

14. A method for producing a breathable film comprising:
   cast extruding a polymeric composition which comprises from greater than 0 wt. % to 60 wt. % of a linear low density polyethylene which exhibits each of the following properties:
   a CEF fraction from 70° C. to 90° C. of equal to or greater than 80% of the total CEF fractions;
   a melt index ($I_2$) measured according to ASTM D 1238 at 190° C., of greater than or equal to 2.0 g/10 min and less than or equal to 5.0 g/10 min; and
   a melt flow ratio ($I_{10}/I_2$) of less than or equal to 6.7 to produce a cast extruded film layer; and
   machine direction orienting the cast extruded film layer.

15. The method according to claim 14, wherein the machine direction orienting is conducted with a stretch ratio of equal to or greater than 1.5.

16. A breathable film produced according to the method of claim 14.

17. A method for producing a breathable film comprising:
   blow extruding a polymeric composition which comprises from greater than 0 wt. % to 60 wt. % of a linear low density polyethylene which exhibits each of the following properties:
   a CEF fraction from 70° C. to 90° C. of greater than or equal to 80% of the total CEF fractions;
   a melt index ($I_2$) measured according to ASTM D 1238 at 190° C., of greater than or equal to 2.0 g/10 min and less than or equal to 5.0 g/10 min; and
   a melt flow ratio ($I_{10}/I_2$) of less than or equal to 6.7 to produce a blown film layer; and
   machine direction orienting the blown film layer.

18. The method according to claim 17, wherein the machine direction orienting is conducted with a stretch ratio of equal to or greater than 1.5.

19. A breathable film produced according to the method of claim 17.

* * * * *